United States Patent [19]
Mann et al.

[11] Patent Number: 5,868,813
[45] Date of Patent: Feb. 9, 1999

[54] I. S. MACHINE

[75] Inventors: Philip A. Mann, West Yorkshire, United Kingdom; Joseph A. Borbone, Paxton, Mass.; Arne Stenholm, Sundsvall, Sweden; Ove Per Pilskaer, Sundsvall, Sweden; Jarmo Kammonen, Sundsvall, Sweden; Steven J. Pinkerton, Avon, Conn.

[73] Assignee: Emhart Glass S.A., Cham, Switzerland

[21] Appl. No.: 964,396

[22] Filed: Nov. 6, 1997

[51] Int. Cl.$^6$ .................................................. C03B 11/12
[52] U.S. Cl. ................... 65/171; 65/172; 65/173; 65/246; 65/305; 65/361; 65/362
[58] Field of Search ............................ 65/171, 172, 173, 65/246, 305, 361, 362

[56] References Cited

U.S. PATENT DOCUMENTS

| | | | |
|---|---|---|---|
| Re. 27,153 | 7/1971 | Donnelly | 65/167 |
| 3,314,775 | 4/1967 | De Shelter et al. | 65/167 |
| 4,636,240 | 1/1987 | Kozora | 65/229 |
| 5,334,233 | 8/1994 | Kozora | 65/171 |
| 5,718,740 | 2/1998 | Mann | 65/171 |

*Primary Examiner*—Stanley S. Silverman
*Assistant Examiner*—Sean Vincent
*Attorney, Agent, or Firm*—Spencer T. Smith

[57] ABSTRACT

An I.S. Machine for making glass bottles, having a plurality of sections, each having a blank station for forming a parison. Each section has a section frame having a top surface, and a plunger mechanism including at least one plunger canister having a lower cylinder and an upper flange. A horizontal mounting plate having a top surface and vertical openings for receiving the lower cylinder of each of the plunger canisters is fixedly secured on the top surface of the section frame. The section frame top surface has vertical openings for receiving the lower cylinders of each of the plunger canisters and the flange of the plunger mechanism is secured to the top surface of the mounting plate.

10 Claims, 34 Drawing Sheets

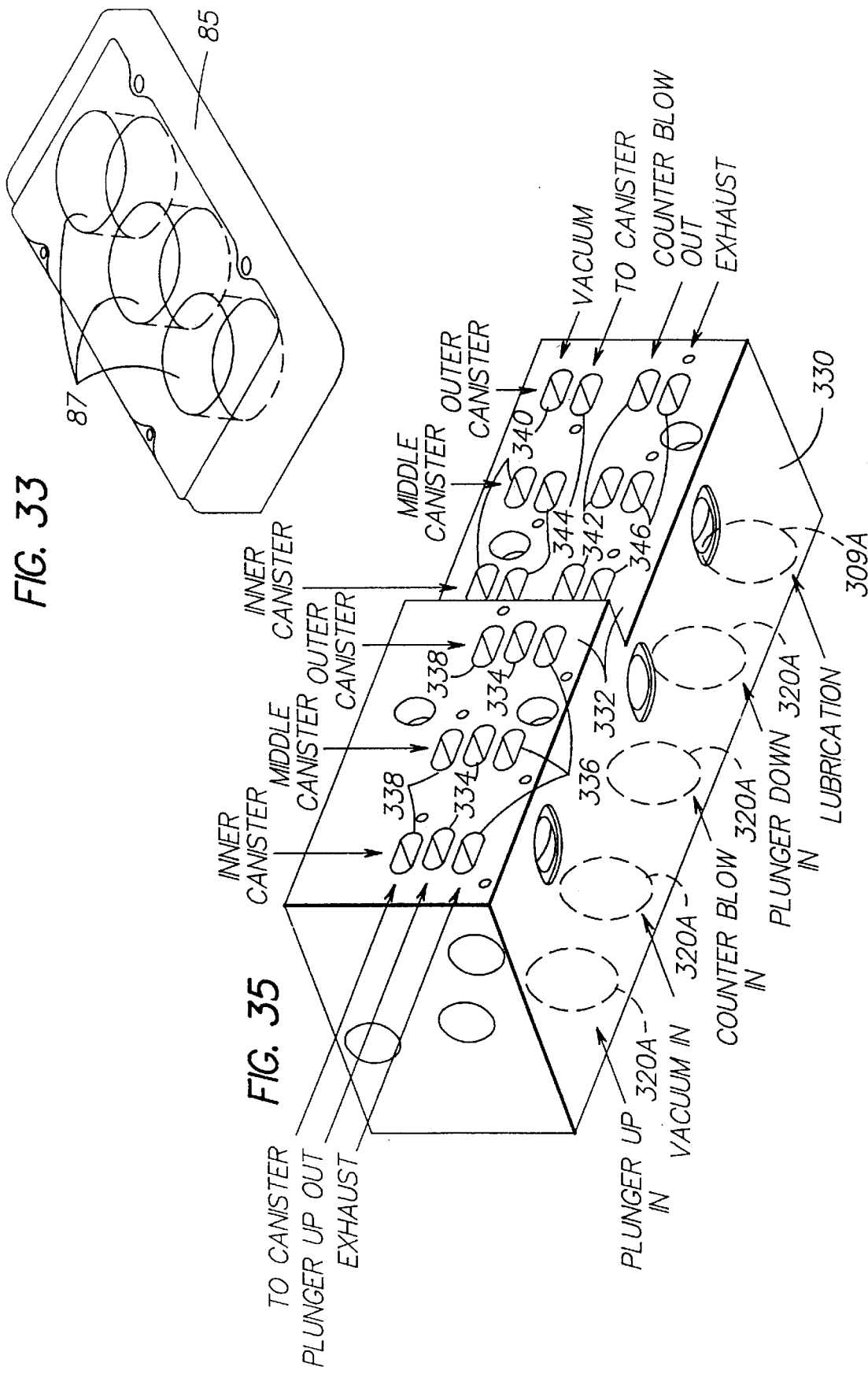

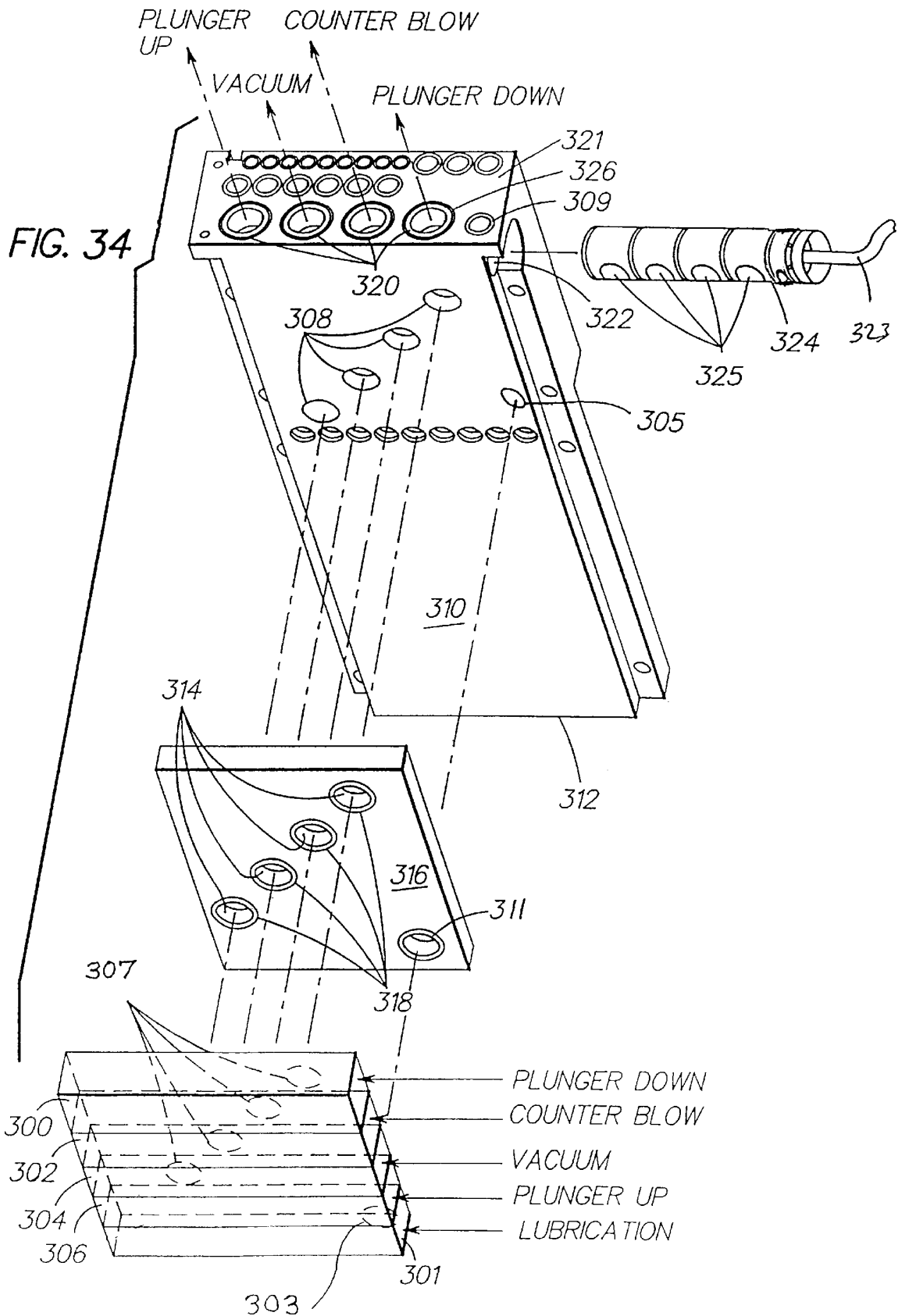

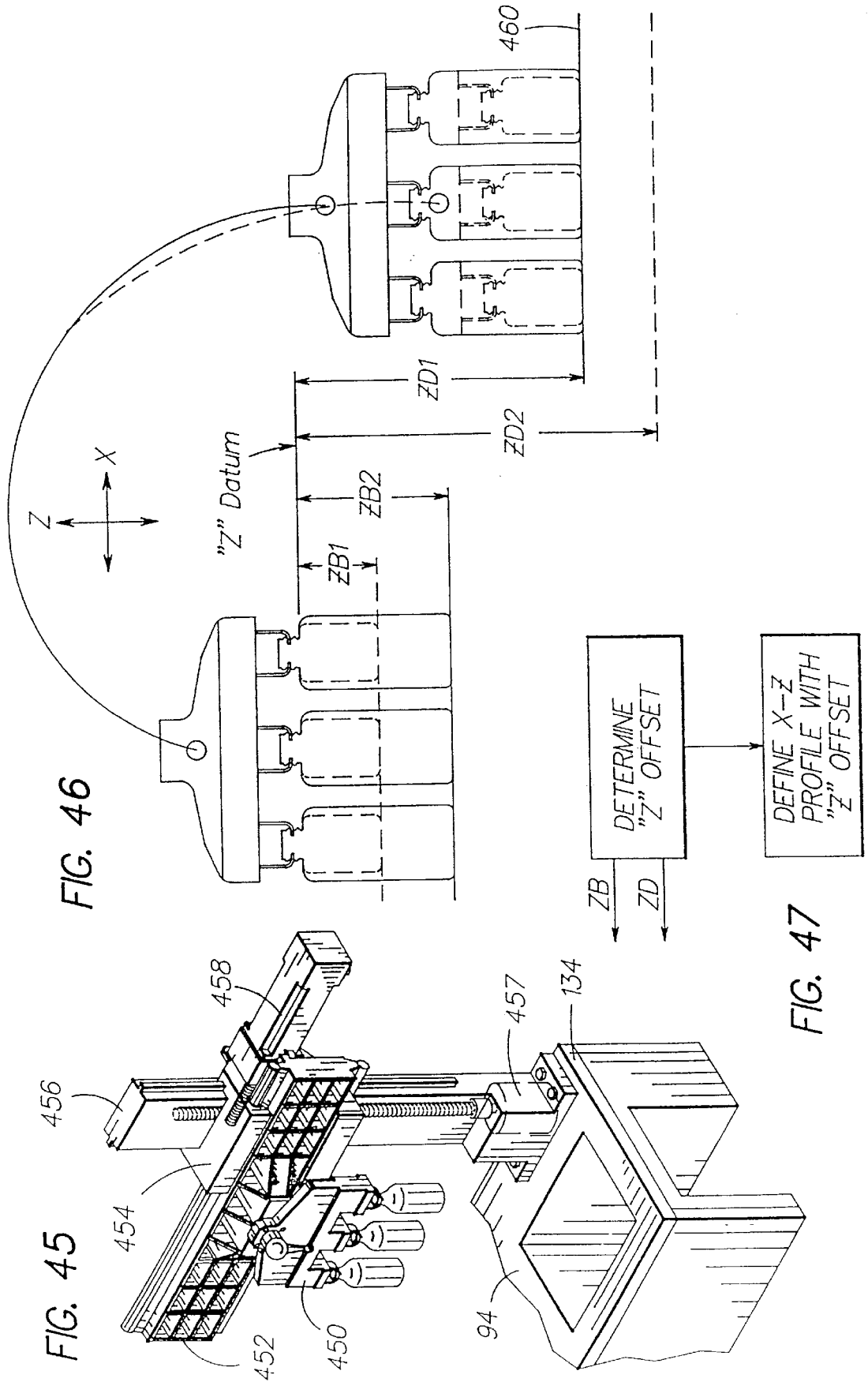

I. S. MACHINE

The present invention relates to the plunger mechanism for an I.S. (individual section) machine which transforms gobs of molten glass into bottles in a two step process.

BACKGROUND OF THE INVENTION

The first I.S. machine was patented in U.S. Pat. No. 1,843,159, dated Feb. 2, 1932, and U.S. Pat. No. 1,911,119, dated May 23, 1933. Today more than 4000 I.S. machines, manufactured by a number of companies, are in use worldwide, producing more than a billion bottles every day of the year. An I.S. (individual section) machine has a plurality of identical sections (a section frame in which and on which are mounted a number of section mechanisms) each of which has a blank station which receives one or more gobs of molten glass and forms them into parisons having a threaded opening at the bottom (the finish) and a blow station which receives the parisons and forms them into bottles standing upright with the finish at the top. An invert and neck ring holder mechanism which includes an opposed pair of arms, rotatable about an invert axis, carries the parisons from the blank station to the blow station inverting the parisons from a finish down to a finish up orientation in the process. A bottle formed at the blow station is removed from the section by a takeout mechanism.

The blank station includes opposed pairs of blankmolds and the blow station includes opposed pairs of blowmolds. These molds are displaceable between open (separated) and closed positions. Opposed pairs of neck ring molds, carried (supported proximate their tops) by the invert and neck ring holder mechanism, define the finish of the bottle and hold a formed parison as it is transferred from the blank station to the blow station.

The length of a parison generally corresponds to the length of a formed bottle and hence the height of the blankmolds may have a wide variety of heights. The blankmolds are conventionally hung, proximate their tops, from suitable carriers such as disclosed in U.S. Pat. Nos. 5,516, 352 and 4,878,935 which try to locate the bottle centrally relative to the axis of the invert and neck ring holder mechanism, whereby the finish of the formed parison will be within a wide range of vertical positions. The vertical location of the neck ring arms accordingly will be changed to follow the finish location and to facilitate this change, quick change neck ring arms have been developed (U.S. Pat. No. 4,652,291).

Since the closed neck rings lie proximate the top of the tooling of a plunger mechanism (either a press and blow plunger or a blow and blow plunger) such as disclosed in U.S. Pat. Nos. 4,272,273, 3,314,775, and 3,190,188, the plunger mechanism will be relocated vertically to follow the neck rings. To this end, since the introduction of the I.S. machine more than 50 years ago, the plunger mechanism, which defines a small hole in the parison at the finish end, has been mounted on a jack screw which is secured to the bottom wall of the section frame. The jack screw can be rotated to raise and lower the plunger mechanism to follow the vertical relocation of the neck ring holders. A conventional plunger mechanism has a vertical stroke (a positioning range) of as much as 8". The plunger mechanism is vertically displaceable relative to a guide ring which is secured to the top wall of the section frame and guides the vertical movement of the plunger mechanism. As a result, any attempt to change the position of the plungers of the plunger mechanism, by displacing the guide ring, to establish alignment between the plunger of the plunger mechanism and the axis of the mold, will tilt the plunger mechanism relative to the fixed base and this is very undesirable. Furthermore, to convert the section from single gob operation to double gob operation or to switch from double gob operation at one spacing to double gob operation at a different spacing, for example, the entire plunger mechanism above the jack screw must be changed. This is made even more difficult since all service air lines (as well as all lubrication lines) which connect to the plunger mechanism via individual hoses, must be individually disconnected and reconnected, and, where the configuration of the machine is changed from double gob operation to triple gob operation, for example, new lines have to be defined. Additionally, since the molds are hung from structure proximate their top, growth due to heat occurs downwardly towards the plunger mechanism and may require repositioning of the neck ring holders and plunger mechanism.

OBJECT OF THE INVENTION

It is accordingly an object of the present invention to provide a plunger mechanism for an I.S. machine wherein the plunger canisters will not be subject to tilting.

Other objects and advantages of the present invention will become apparent from the following portion of this specification and from the accompanying drawings which illustrate a presently preferred embodiment incorporating the principles of the invention.

BRIEF DESCRIPTION OF THE DRAWINGS

Referring to the drawings:

FIG. 13 is an oblique view illustrating the machine bed for supporting the individual sections of the I.S. machine;

FIG. 33 is an oblique view of the plunger mounting plate;

FIG. 34 is an oblique, separated view illustrating the connection of the first four service ducts to bottom of a plunger distribution base;

FIG. 35 is an oblique view looking at the front face of a conjunction box;

FIG. 45 is an oblique view of a takeout mechanism made in accordance with the teachings of the present invention;

FIG. 46 is a schematic illustration of the displacement of the takeout arm of the takeout mechanism shown in FIG. 45; and FIG. 47 is a flow diagram of the "Z" offset algorithm of the takeout mechanism control.

BRIEF DESCRIPTION OF THE PREFERRED EMBODIMENT

Figure 1:
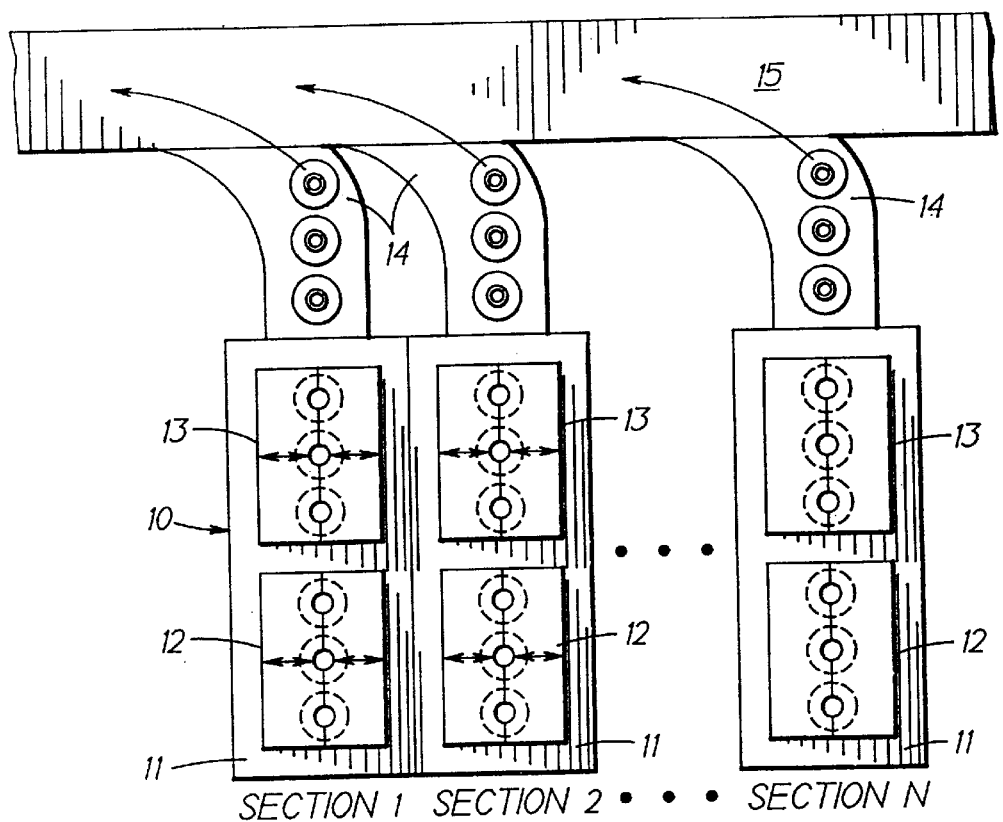
FIG. 1 is a schematic drawing of an I.S. machine having a number of identical sections each having a blank station and a blow station.

An I.S. machine 10 includes a plurality (usually 6, 8, 10, or 12) of sections 11. A conventional section is made up of a box-like frame or section box 11A (FIG. 2) which houses or supports section mechanisms. Each section has a blank station including a mold opening and closing mechanism 12 carrying blankmolds which receive discrete gobs of molten glass and forms them into parisons and a blow station including a mold opening and closing mechanism 13 carrying blowmolds which receives the parisons and forms the parisons into bottles. One, two, three or four gobs can be processed in each section, each cycle and the machine will be referred to as a single gob, double gob, triple gob (the illustrated embodiment) or quadruple gob machine depending on the number of gobs simultaneously processed in each section during a cycle. The formed bottles are removed from the blow station by a take out mechanism (FIG. 40) and transferred to a dead plate 14 and then transferred by a pusher mechanism (not shown) to a conveyor 15 which takes the bottles away from the machine. The front of the machine (or section) is the end remote from the conveyor, the back of the machine is the end adjacent the conveyor and the sides of the machine or sections extend perpendicularly to the conveyor. Side to side movement is movement parallel to the conveyor.

Figure 2:
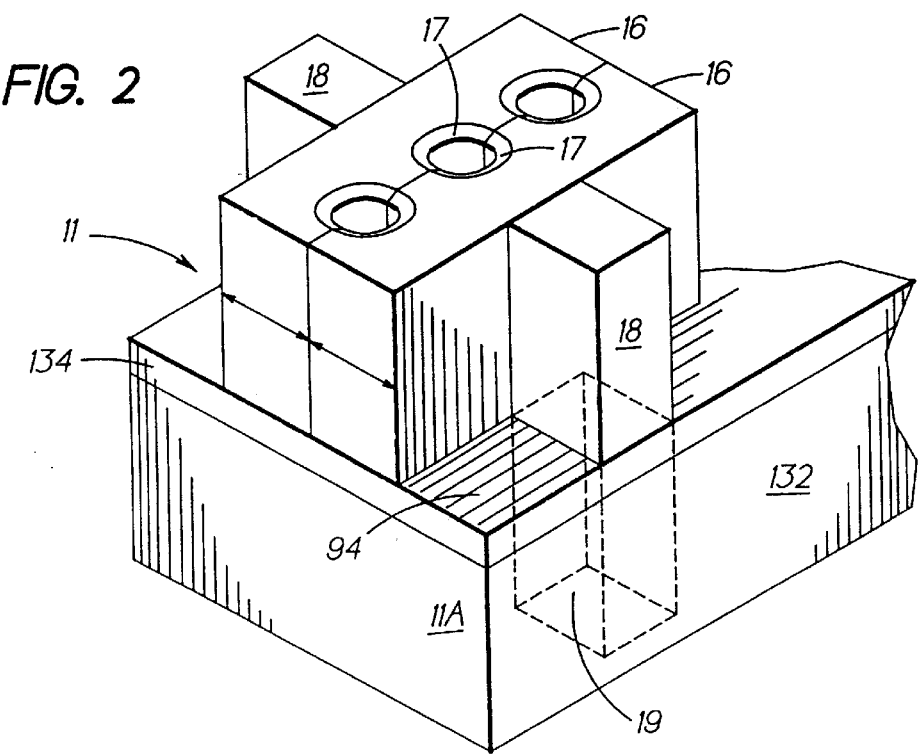
FIG. 2 is an oblique view of one of the section stations schematically showing a mold open and close mechanism.

FIG. 2 shows a portion of a section 11 of a triple gob machine made in accordance with the teachings of the present invention schematically showing either molding station. The section 11 comprises a section frame 11A which is generally in the form of a box, having a top wall 134 with a top surface 94 and side walls 132. Each mold open and close mechanism includes an opposed pair of mold support mechanisms 16. Each mold support mechanism is connected to and operated by a drive assembly means comprising a rotary to linear transmission 18, mounted on top of the section frame 11A and driven by a drive system 19 having a rotary output to displace the associated mold support mechanism 16, linearly in a sideways direction, between a retracted separated position and an advanced position where the mold halves carried on an opposed pair of mold support mechanisms will forcefully engage. The mold support mechanisms for the blank station are identical and the mold support mechanisms for the blow station are identical but a mold support mechanism at the one station may be dimensionally different from a mold support mechanism at the other station as a result of differences in the process which would be well known to a man skilled in this art. Since the illustrated machine is a triple gob machine, each mold support mechanism at the blank or blow station will support three mold halves (blankmolds or blowmolds) 17.

Figure 3:
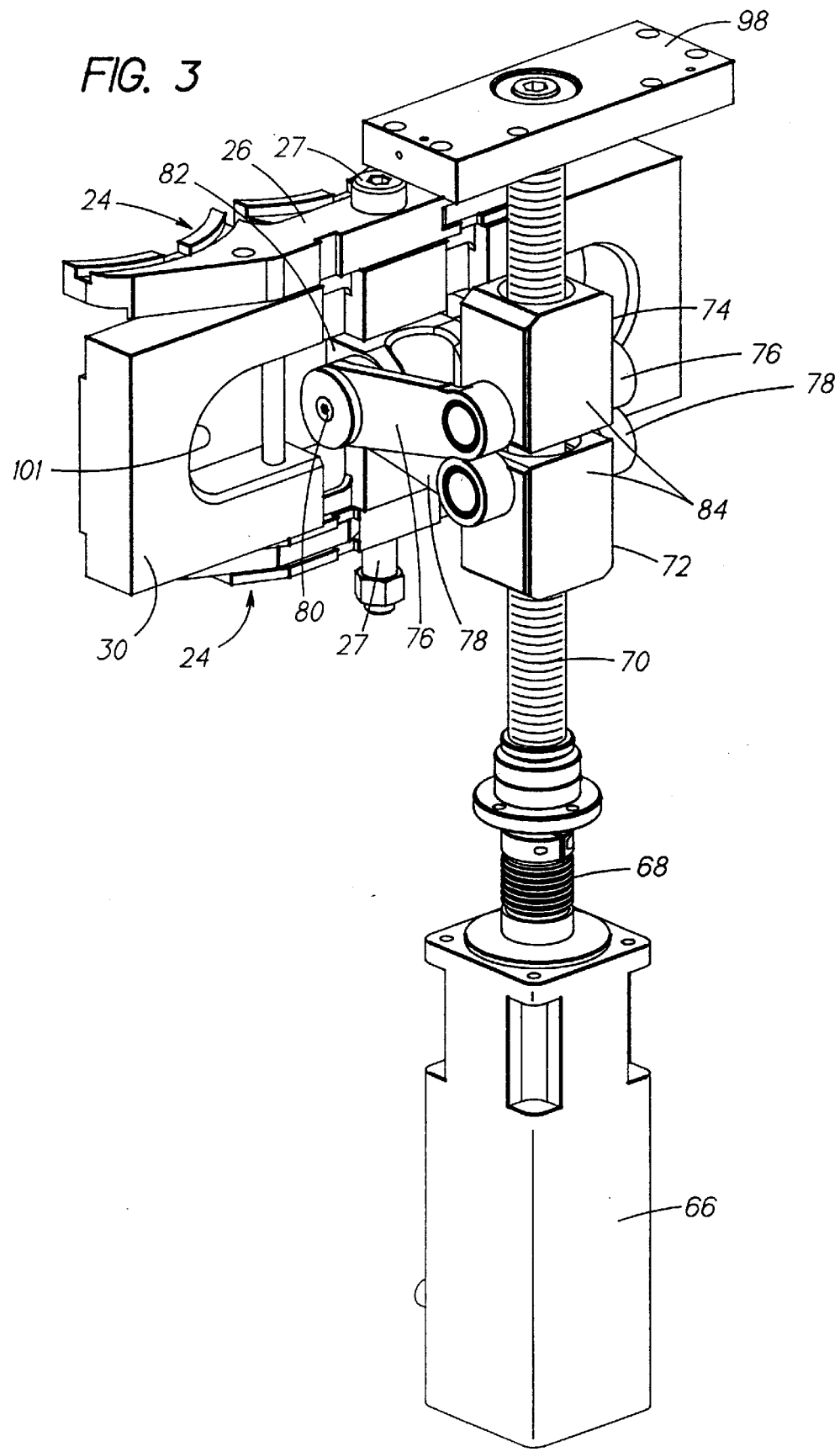
FIG. 3 is an oblique view showing the interconnection of one of the mold support mechanisms shown in FIG. 2 with its lead screw drive assembly.
Figure 4:
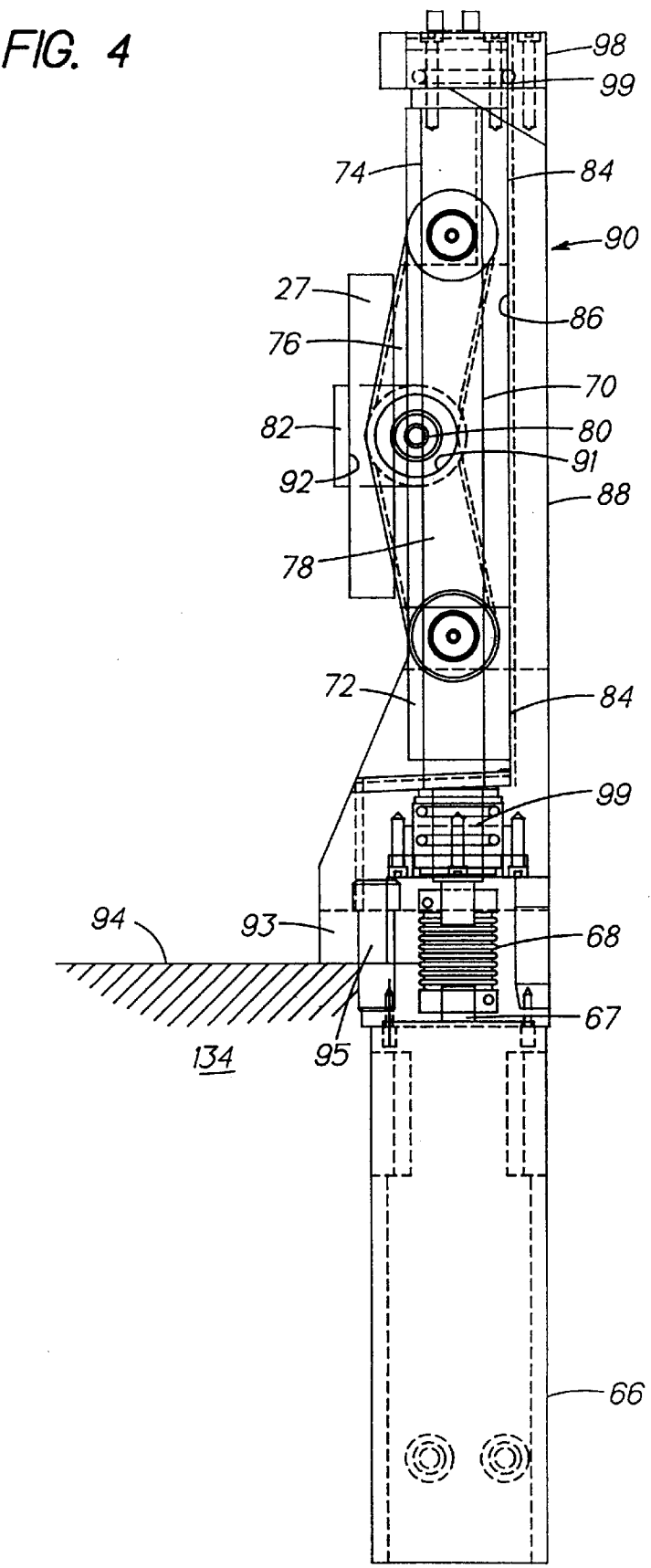
FIG. 4 is a side elevational cross sectional view of the lead screw drive assembly shown in FIG. 3.
Figure 5:
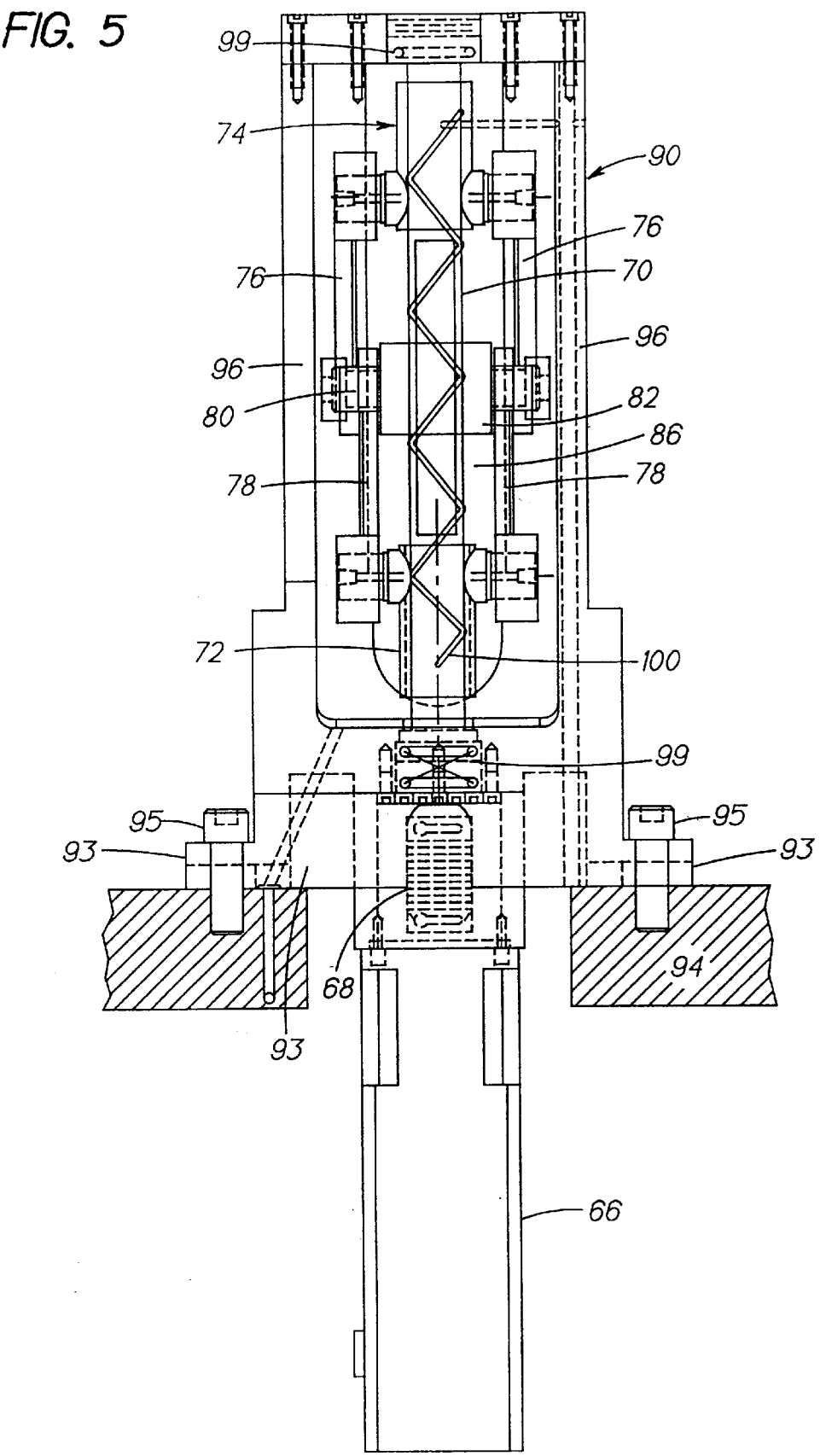
FIG. 5 is a front view of the lead screw drive assembly shown in FIG. 3.
Figure 6:
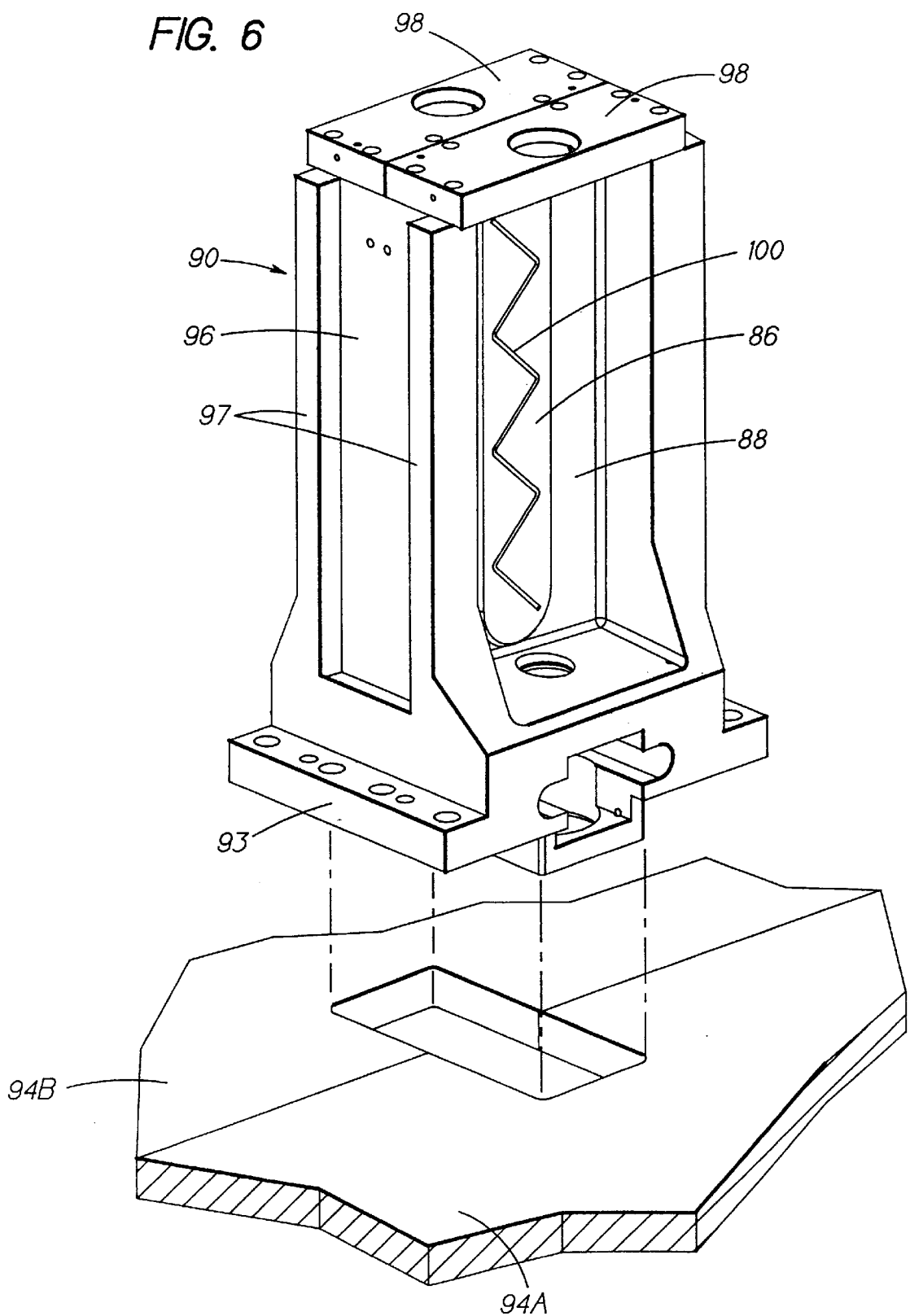
FIG. 6 is an oblique view of a transmission housing design separated from its support.

The interconnection of a mold support mechanism to its drive and the means for displacing a mold support mechanism between advanced and retracted positions will now be described with reference to FIGS. 3, 4 and 5. FIGS. 4 and 5 show only a mold support mechanism which supports mechanism associated with a single section, whereas FIG. 6 shows an alternate housing which will support two mold support mechanisms when two sections are adjacent and only one when no section is adjacent. The drive system 19 includes a servo motor 66 (with any gearbox and/or direction changer) having a rotary output in the form of a spindle 67 (FIG. 4) which is connected to a lead screw 70 (ball or Acme, for example), which has upper right hand and lower left hand thread portions, via a coupling 68. A housing 90 supports the lead screw 70. The lead screw is supported at its ends in the housing 90 in a vertical orientation in suitable single radial or duplex ball bearing assemblies 99. The housing has a base portion 93 which is secured to the top surface 94A, 94B (FIG. 6) of two adjacent section frames (the top wall of the section will be extended outwardly to support the housing when there is no adjacent section) by suitable screws 95, opposed side walls 96 which include reinforcing ribs 97 and removable top portions 98. The lead screw is connected to a rotary to linear transmission which includes nut means comprising a lower left hand nut 72 and an upper right hand nut 74 received by the lead screw. The rotary to linear transmission additionally comprises means for interconnecting the nuts 72, 74 with a mold support mechanism, comprising a first pair of jack links 76 connected at one end to the upper nut 74, a second pair of jack links 78 connected at one end to the lower nut 72, and a yoke 82 having a horizontal bore 91 supporting a transverse, horizontal pivot shaft 80 to which the other ends of the jack links 76, 78 are pivotally connected (sleeve or flange bushings are utilized to extend link life). The yoke 82 also has a vertical bore 92 which pivotally receives a vertical pivot shaft 27 of the mold support mechanism. Rotation of the lead screw 70 in one direction will accordingly advance the mold support mechanism towards the opposed mold support mechanism and vice versa. It can be seen that the jack links 76 and 78 provide a toggle linkage movable between an extended and a retracted condition and acting horizontally between the housing 90 and the mold support mechanism.

Each mold support mechanism has a carrier 30 and upper and lower inserts 24 which support the mold halves and which are supported on the carrier 30 by the shaft 27 which passes through vertical holes in the carrier 30, the inserts 24, and the yoke 82. The yoke 82 is received in a pocket 101 in the carrier 30. As can be seen from the drawings, the lead screw is vertical and adjacent the mold support mechanism and the rotary to linear transmission, which interconnects the rotary output of the servo motor (the lead screw) and the mold support mechanism, is positioned compactly between the lead screw and the mold support mechanism on top of the section top wall 134. The rotary to linear transmission is located completely above the top of the section frame and applies a load to the mold support mechanism through the yoke approximately at the center (vertically and horizontally) of the mold support mechanism (vertically, the axis of horizontal shaft 80 lies midway between the upper insert 24 and the lower insert 24 and horizontally, the axis of vertical shaft 27 is located at the center of mass of the carrier 30 (and inserts 24). The load which is transferred directly from the vertical shaft 27 to the upper and lower inserts 24 lies in a plane extending normally to the engagement plane of the molds and intersecting the center of the molds (the center of the center mold or where there are an even number of molds, midway between the center molds). The direction of this load is perpendicular to the plane of engagement between the opposed mold halves (the clamping plane) and since the vertical pivot shaft 27 rotatably receives both the inserts 24 and the yoke 82, and the yoke additionally rotatably supports the horizontal pivot shaft 80, which is connected to the toggle links, the inserts 24 are not subjected to any twisting forces when a clamping load is applied. The force applied by the rotary to linear transmission will accordingly be transmitted directly to the inserts 24—the carrier 30 is not in the force path of clamp loading.

Each nut 72, 74 comprises a flat rear bearing surface 84 which is associated with a flat elongated vertical machined bearing surface 86 defined on a rear wall 88 of the transmission housing (casting) 90. When the mold support mechanism is retracted, a selected spacing (clearance) separates the rear bearing surface of the nuts 72, 74 from the vertical bearing surface 86 defined on the rear wall. The lead screw is selected to have such a rigidity that when the mold supporting mechanisms are advanced to bring the supported mold halves into clamping engagement with the opposing mold halves and a desired load is applied therebetween, the lead screw 70 will deflect sufficiently to bring the nut bearing surfaces 84 into engagement with the wall bearing surface 86. The lead screw housing 90 has sufficient rigidity to assure that this load can be applied and the removable top portion 98 can be adjusted, prior to fastening in place, to set the desired clearance between the bearing surface of the nuts and the wall bearing surface. The mold halves, the mold support mechanisms, the opposed transmissions, and the housing 90 will accordingly define a truss (made up of triangular structures) supported above the top surface of the section frame to inhibit both vertical displacement (the truss will accordingly isolate the support shafts from a downward load) or sideways (horizontal) separation of the mold halves from vertical loads applied during the forming process. To provide lubrication for the bearingsurfaces 84, 86, an oil groove 100 may be defined in the rear wall surface 86 and oil can be supplied to this groove through suitable passages extending through the lead screw housing 90. To minimize stiction, the machined surface may be impregnated with solid lubricant. To provide greater strength the lead screw housing 90 (FIG. 6) may be duplexed so that it can support lead screws from adjacent sections which will be connected to rotary to linear transmissions from those adjacent sections.

Figure 7:
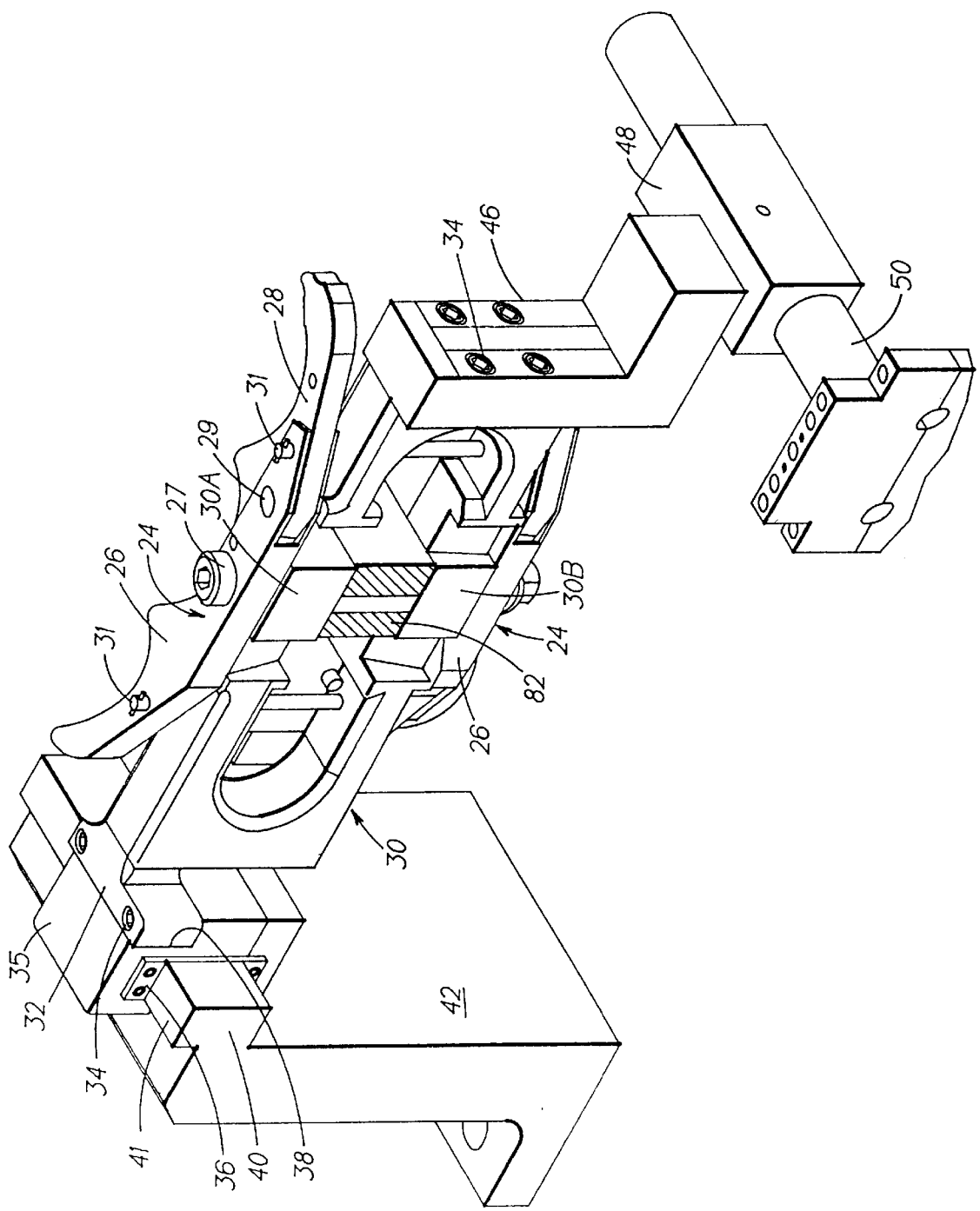
FIG. 7 is an oblique view illustrating how a mold support mechanism is supported for linear displacement in a direction perpendicular to the clamping plane.

Each insert 24 (FIG. 7) comprises a first portion 26 which is pivotal about the vertical pivot shaft 27 and which carries one of the mold halves and a second portion 28 which carries the other two mold halves and is connected via a pivot pin 29, to the first portion 26 at a location that will assure that forces will be applied equally to each mold. The pivot shaft 27 slidingly passes downwardly through the first insert portion 26 of the upper insert 24, through an upper wall 30A of a carrier 30, through the transmission yoke 82, through a lower wall 30B of the carrier 30 and finally through the first portion 26 of the lower insert 24. A pair of pins 31, which extend downwardly through the upper insert 24, through carrier 30 and through the lower insert 24, have a selected clearance relative to the insert portions to limit the desired motion of the first and second insert portions 26, 28.

The mold support mechanisms are, as will now be described, slidably mounted for movement on two parallel shafts 40, 50. The carrier 30, which extends in a direction parallel to the clamping plane, has an outboard (remote from the invert and neck ring holder mechanism—FIG. 8) mounting flange 32 on one end. The mounting flange is secured by suitable fasteners 34 to a block 35 which has a suitable cutout 38 for receiving the flange and has a flat horizontal bearing surface 36 for riding on a flat horizontal bearing surface (way) 41 defined on a the shaft 40 which is square and is part of a bracket 42 which is secured to the section frame proximate an end (the bracket 42 could optionally be formed as part of some other mechanism housing). Wipers (not shown) will keep the way surface clean and lubricant can be supplied to the block so that the bearing surfaces can be lubricated. The inboard (proximate the invert and neck ring holder mechanism) end of the carrier 30 is secured by suitable fasteners 34 to an "L" shaped block 46 which is integral with a bearing block 48 and has a cylindrical bearing surface which slides on the cylindrical bearing surface of shaft 50.

An invert and neck ring holder mechanism 110 (FIG. 8) is mounted on the top surface of a section box between the blank station and the blow station. This mechanism has a pair of opposed neck ring holders 112 which can be displaced from a separated position to the shown closed position by suitable horizontally oriented pneumatic cylinders 114. These neck ring holders support opposed pairs of neck ring halves 115 which close the bottom of the blankmolds when the mold halves are closed and which, when the neck rings are closed, define the finish (threads) 116 of the parison and ultimately the bottle. When the finish has been formed, the neck ring holders 112 will be rotated 180° by the invert and neck ring holder mechanism by operating a servomotor 108 to rotate a drive shaft in the form of a worm (not shown) supported by a worm housing 118 which rotates a worm gear which is supported within a suitable worm gear housing 120. The invert and neck ring holder mechanism cylinders 114 are suitably supported between opposed spaced vertical supports or brackets 122 and the worm gear housing. The vertical worm housing 118 and the invert brackets 122 are secured to the top surface of the section frame.

Figure 8:
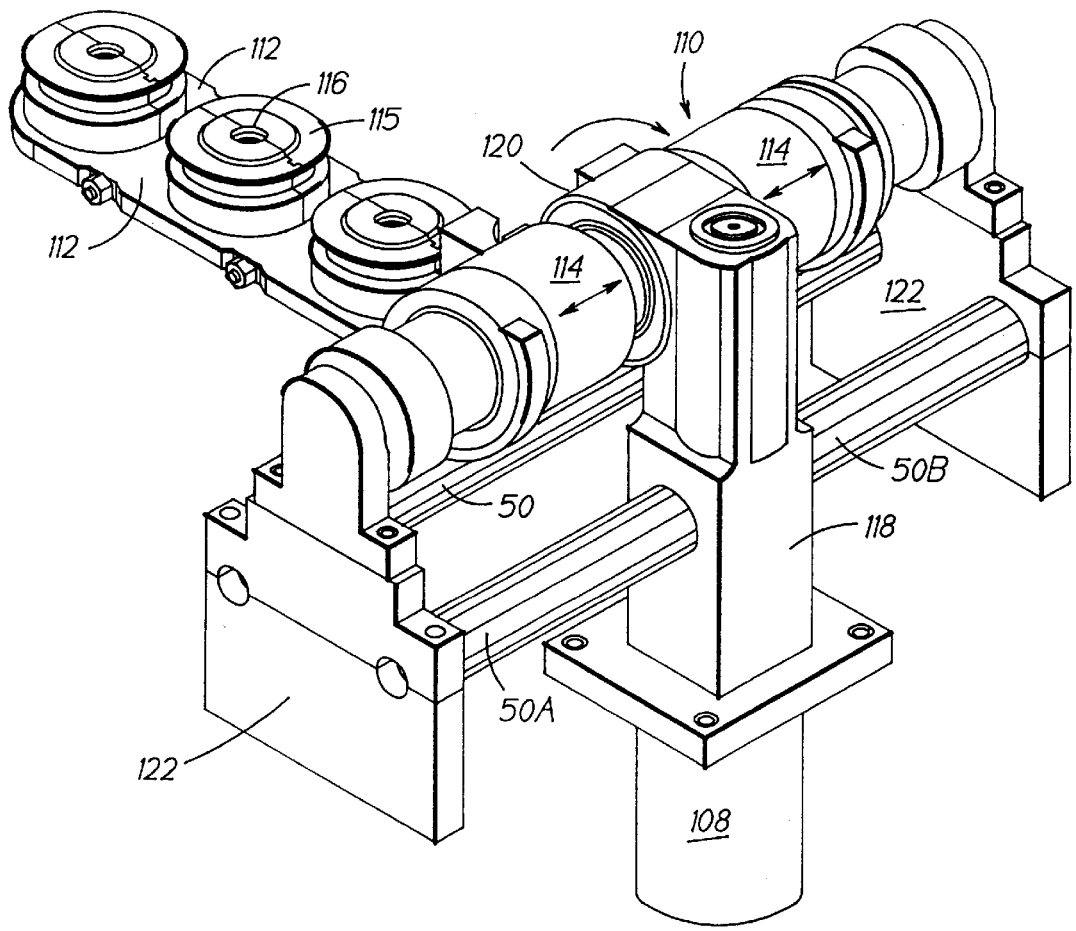
FIG. 8 is an oblique view of the invert and neck ring holder mechanism for delivering parisons from the blankmolds to the blowmolds.

As can be seen from FIG. 8, the round shaft 50 for the blank side mold opening and closing mechanism, which is located proximate the invert and neck ring holder mechanism, is supported at either end by the opposed invert brackets 122. The round shaft for the blow side mold opening and closing mechanism is a two part round shaft 50A, 50B. These shafts are mounted coaxially and each is supported at one end by an invert bracket 122 and at the other end by vertical worm housing 118. The square shafts 40 enable the carrier, whether at the blank station or at the blow station, to expand with an increase in temperature in a uniform direction away from the invert axis (the center of the section).

Figure 9:
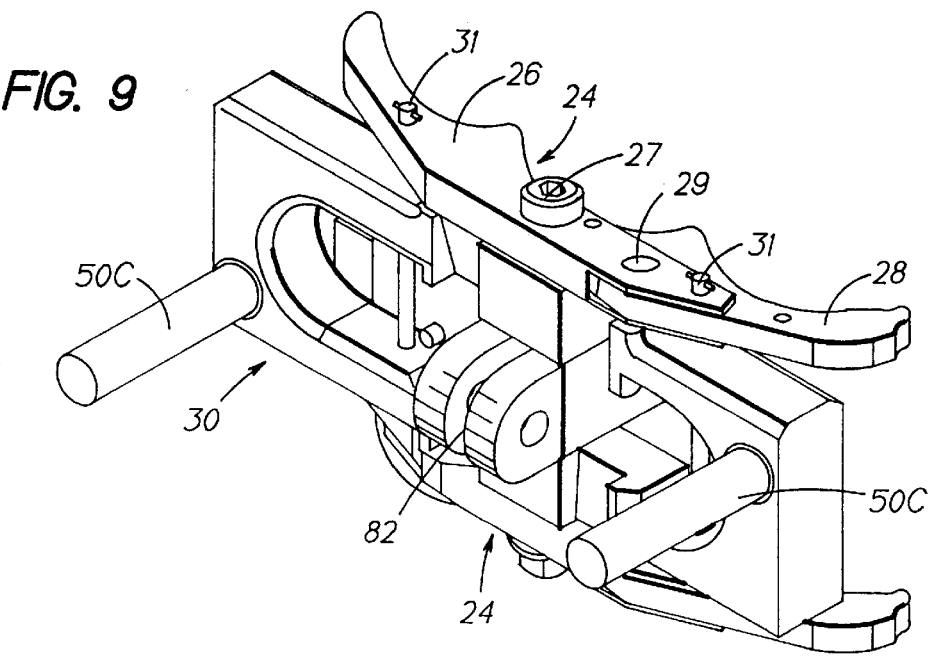
FIG. 9 is a view similar to that of FIG. 7 illustrating a second way for a mold support mechanism to be supported for linear displacement.
Figure 10:
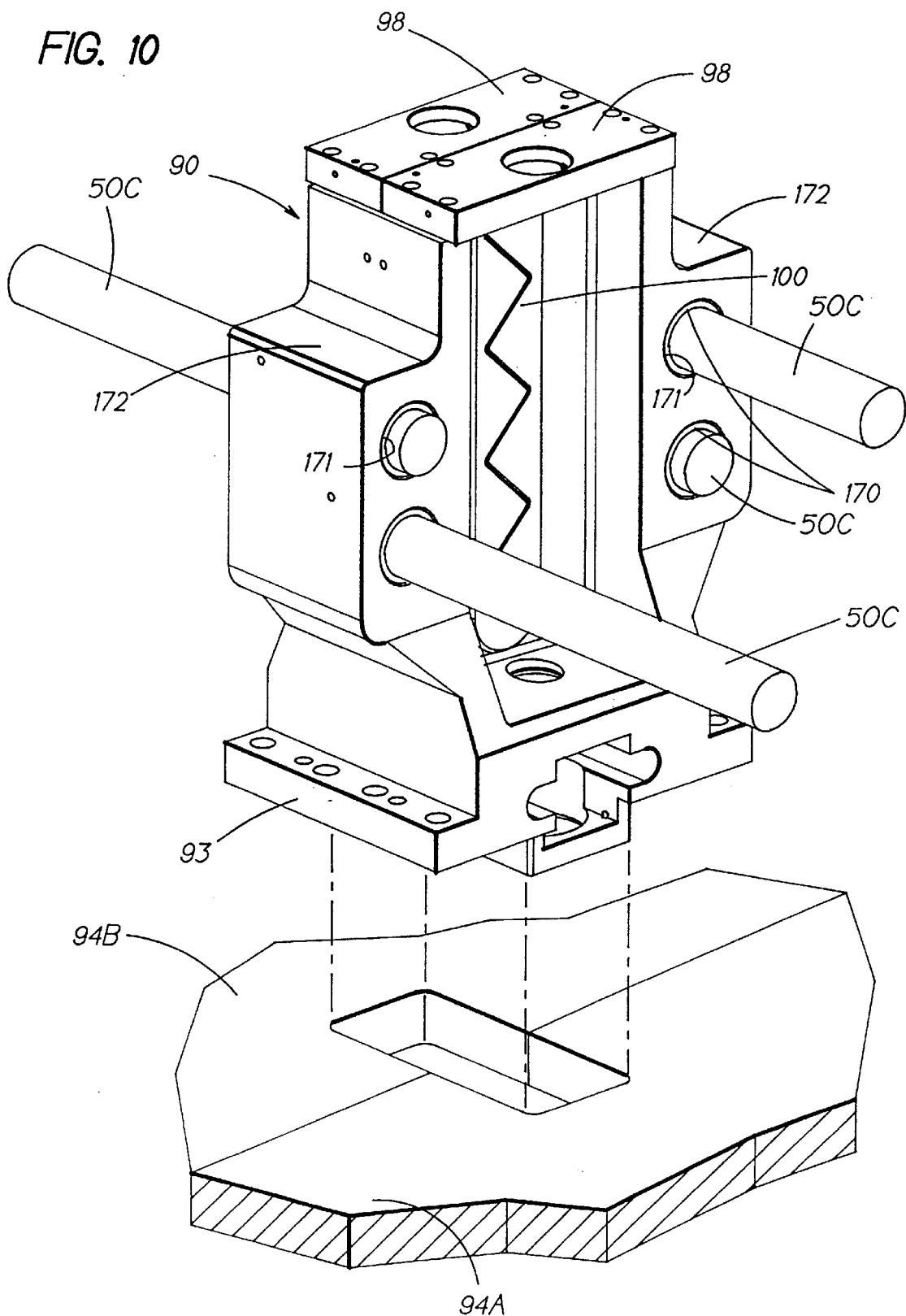
FIG. 10 is a view similar to that of FIG. 6 illustrating the transmission housing design for the embodiment shown in FIG. 9.
Figure 11:
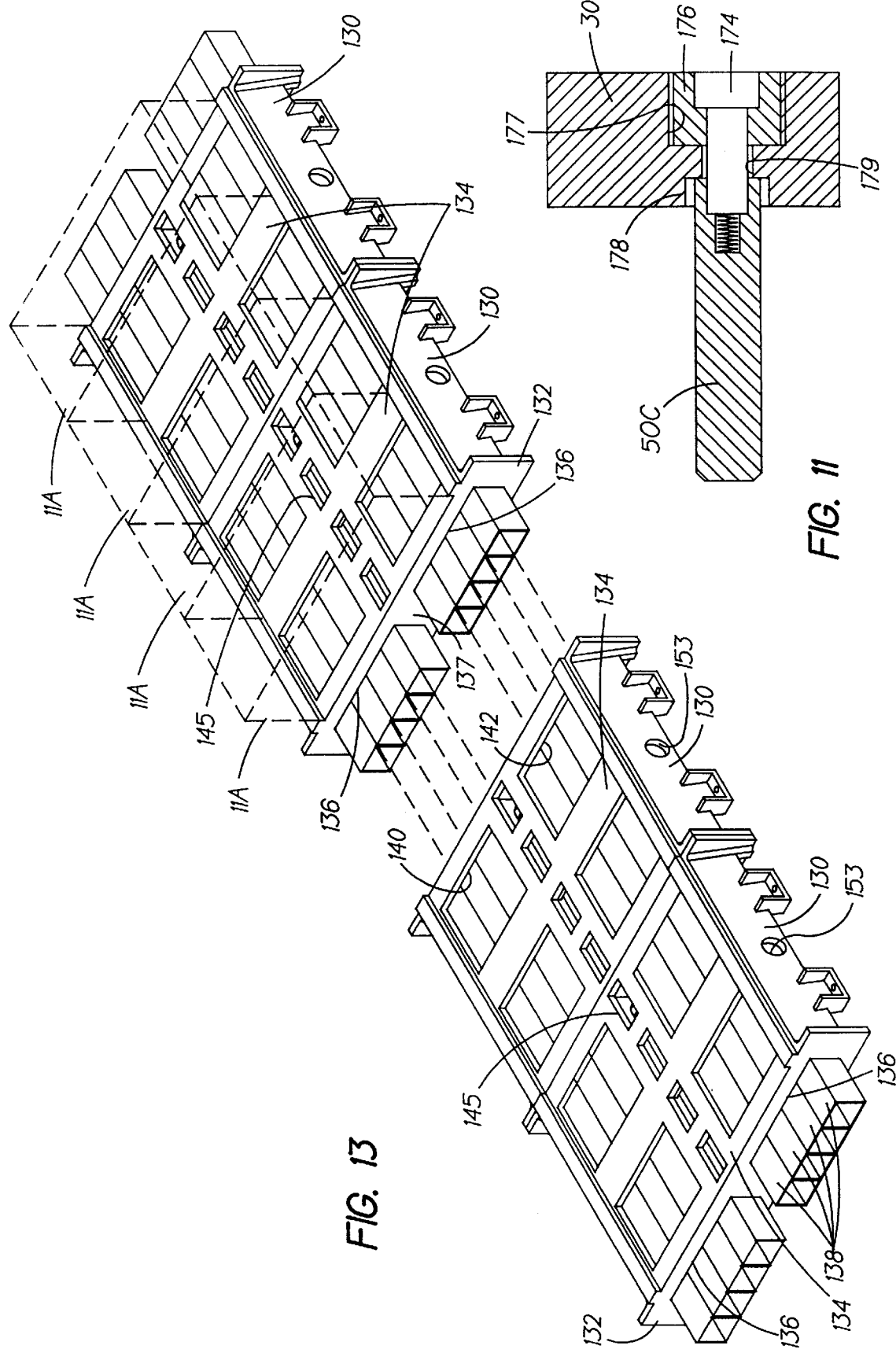
FIG. 11 is a cross sectional view of a portion of the mold support mechanism illustrated in FIG. 9 showing how one of the round shafts can compensate for heat growth.

Alternatively, as shown in FIGS. 9–11, two round shafts 50C can be mounted directly on the carrier 30. The free end of these shafts is slidably received by suitable bearings 170 (FIG. 10) located within suitable bores 171 in a pair of mounting blocks 172 which are designed to be integral with the lead screw housing 90. Each mounting block has a pair of vertically spaced bearings 170 for receiving a round shaft 50C from mold support mechanisms of adjacent sections. Each pair of round shafts associated with a particular section (one upper and one lower) are vertically located equidistant above and below the axis of the horizontal yoke pivot shaft 80. Since heat growth of the drive housing will not be as great as heat growth of the carrier 30 a compensation mechanism is built into the carrier so that a carrier, whether at the blow station or at the blank station, will expand with an increase in temperature in a uniform direction away from the center (the invert axis) of the section. As shown in FIG. 11, a screw 174 interconnects a key 176 on one side of the carrier 30, which is slidable horizontally in an elongated horizontal keyway 177, with the outboard round shaft SOC on the other side of the carrier. The carrier bores 178 and 179 that receive the round shaft and the screw have sufficient clearance to permit the key to slide horizontally in its keyway (relatively) to enable this round shaft to maintain its parallelism with the other round shaft through a range of environment temperatures.

In both the embodiment shown in FIG. 8 and the embodiment shown in FIGS. 9 and 10, each carrier is supported on a round shaft located between the invert axis and the center of the mold open and close mechanism while being supported on the other side of the center of the mold open and close mechanism on a shaft which can accommodate a temperature driven expansion away from the invert and neck ring holder mechanism axis. This means that temperature expansion at both the blow station and the blank station will proceed in the same direction (away from the invert and neck ring holder mechanism axis) This has never been previously achieved. In all prior I.S. machines, expansion at the blank side occurs towards the invert and neck ring holder mechanism whereas expansion at the blow side occurs away from the invert and neck ring holder mechanism. In this regard, the expansion at the blank and blow stations is always in the same direction as the neck ring holder allowing for better machine alignment.

Figure 12:
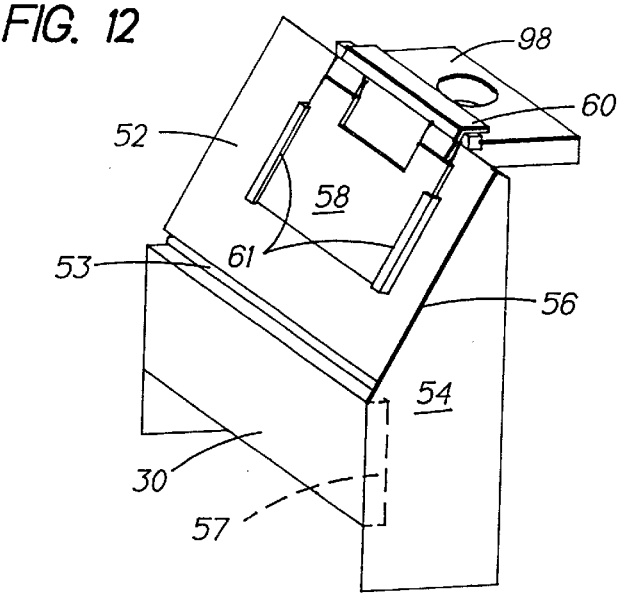
FIG. 12 is an oblique view illustrating a shield for the lead screw and transmission.

FIG. 12 illustrates a shield structure for one of the lead screw housings. As shown, the carrier is fully retracted. The shield has a front inclined wall 52 which is coextensive with the top of the carrier 30 and which is connected to the rear top edge of the carrier by a hinge 53. The shield also has sides 54 which are integral with the inclined top portion along each edge 56 of the top portion. Each side has a vertical portion 57 which covers the end of the carrier in this retracted position. A shield control, in the form of a flap 58 connected to the front edge of the top portion 98 at a hinge 60, is received within opposed inwardly projecting brackets 61 secured to the inclined front wall 52 of the shield. At the retracted position the top edge of the shield is proximate the hinge 60. When the carrier is advanced, the top portion of the shield (and the flap) will become less inclined and the flap and the top portion will move relatively to accommodate the displacement.

With the transmissions of the mold open and closed mechanisms located above the top wall of the section frame and with the transmissions powered by electronic motors which are mounted, as shown, to extend downwardly from the top wall of the section frame, the floor portion of the section frame, which conventionally is filled with these motors (air cylinders) and transmissions (linkages), becomes open. The section frames 11A of the machine (there may be 6, 8, 10, etc.) are mounted on the machine base, which is defined by a number of two-section beds 130 (FIG. 13) which are connected together. Each two-section bed 130 has side 132 and top 134 walls. The two-section bed has passage means extending from one side to the other side of the bed continuous with rectangular openings 136 in the bed sides 132, which are separated by a side wall rib 137 for slidably receiving a plurality (eight in the preferred embodiment) of seamless square fluid ducts 138 which extend the entire width of the machine. The ducts are supplied with pneumatic services, cooling air, process air, lubrication, and process vacuum, etc., as required. The top wall 134 has blank station openings 140 and blow station openings 142 which expose these fluid ducts 138 within each of the section boxes.

Section cables and wiring extend beneath the fluid ducts in suitable conduits and come up through the space between the duct groups and through wiring ports 145 defined in the bed top wall 134 for connection to individual mechanisms.

Figure 14:
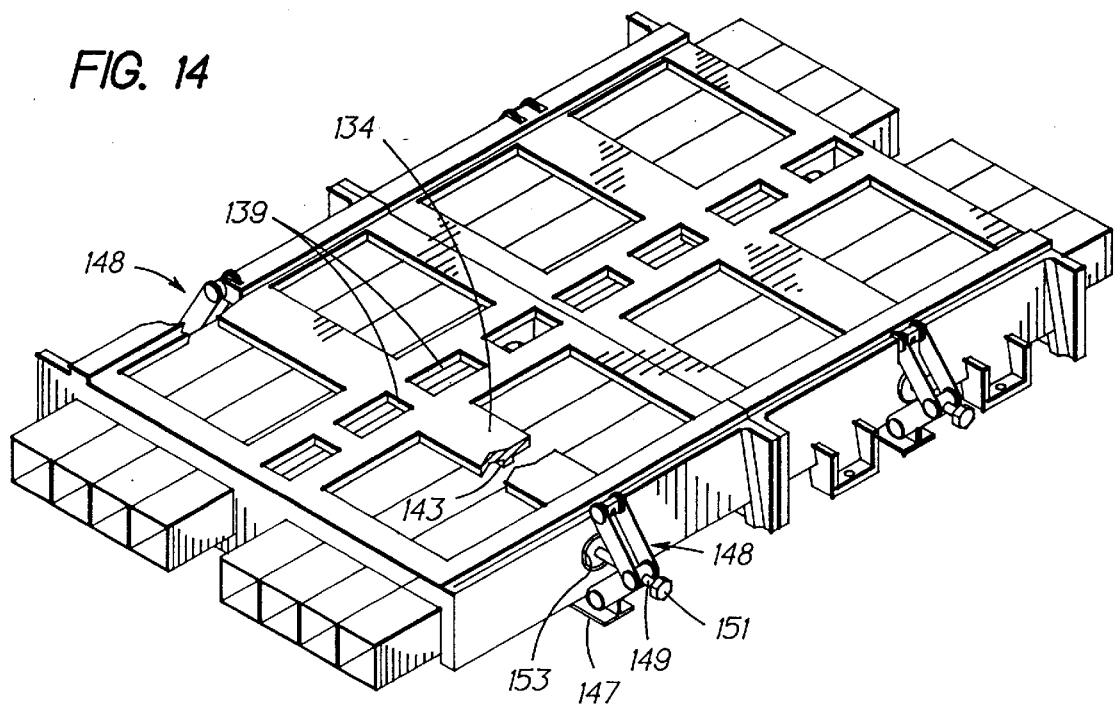
FIG. 14 is an oblique view of a portion of the machine bed.

The ducts 138, which run from one end of the machine to the other and which are connected to suitable sources, are releasably clamped to each two section bed by a clamping structure (FIG. 14) which includes an "I" beam 147, which underlies all of the ducts, and a toggle device 148 at the front and back of the bed which is connected between the "I" beam and the top wall of the bed. Each toggle device has a toggle operating screw 149 which has an engagable head 151, and which can access the ducts 138 through suitable bed openings 153. Rotation of the operating screw in one direction will push the ducts against the side wall ribs 137 and elevate them upwardly into forced engagement with a rib 143 which projects down-wardly from the top wall 134 of the two section base. Should it be necessary to remove one of these ducts and replace it with two ducts, for example, the duct clamping mechanism can be released by rotation of the engagable head of the toggle mechanisms in the opposite direction so that the duct can be slidingly removed and replaced with multiple side by side ducts (ducts can be added or deleted to define the number of ducts desired).

Figure 15:
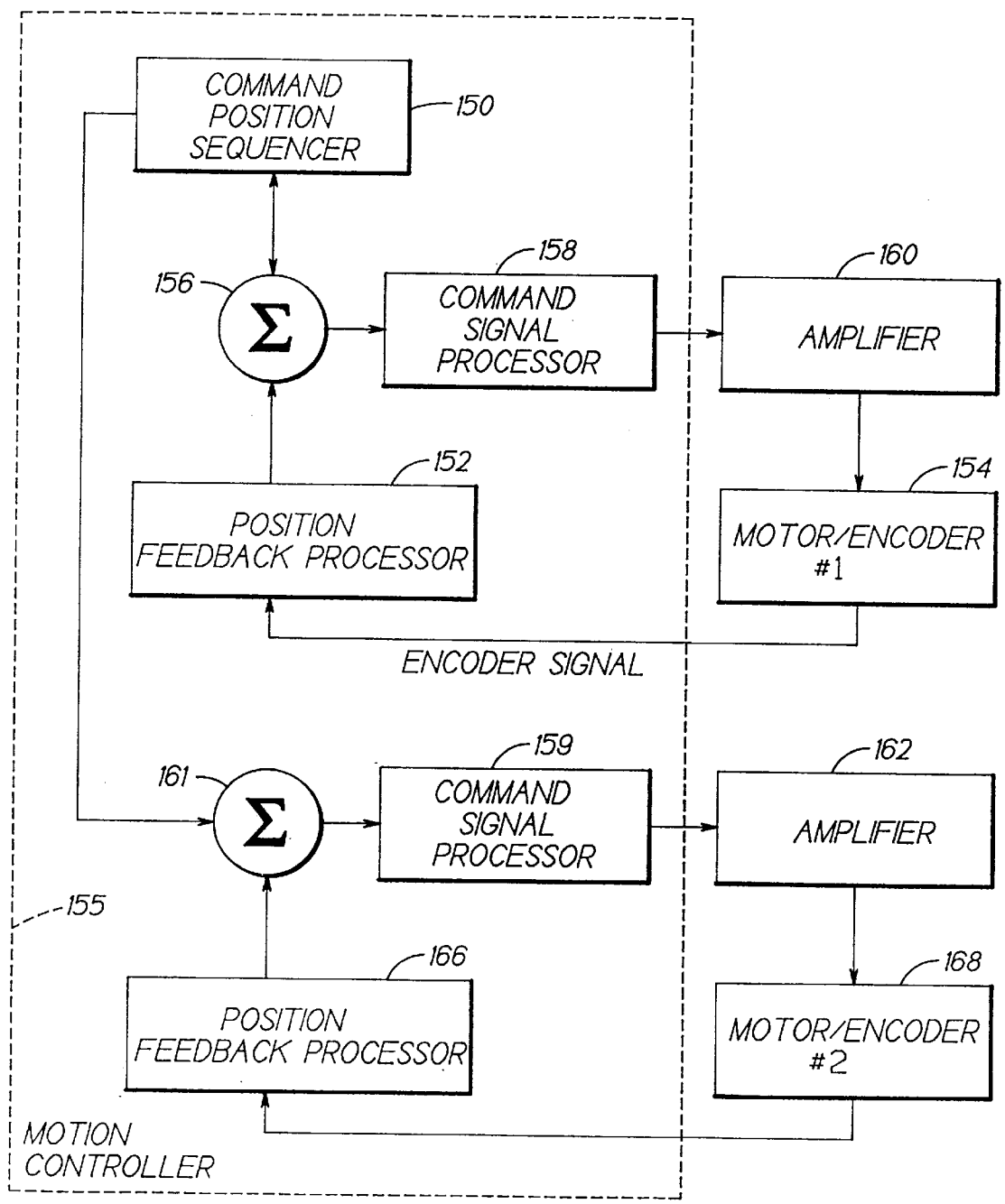
FIG. 15 is a first electronic schematic diagram for the drive for a mold opening and closing mechanism.
Figure 16:
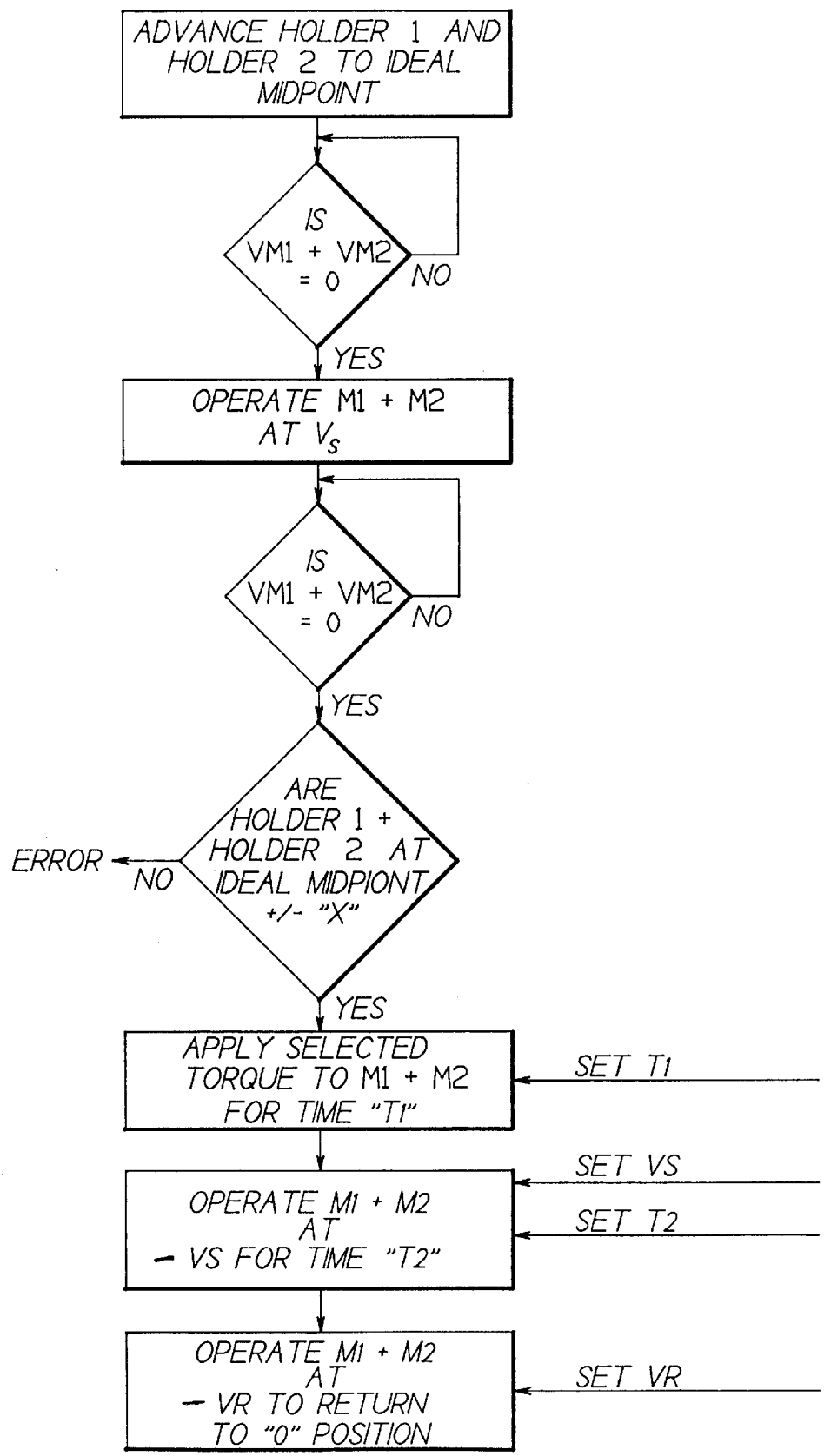
FIG. 16 is a first flow chart illustrating the control algorithm for a mold opening and closing mechanism.

Referring to FIGS. 15 and 16, each motor of a mold opening and closing mechanism operates in a conventional manner where feedback signals are supplied to a motion controller, which controls the servo amplifiers that operate the motors (servo motors). As shown, the motors are electronically geared together. Motor/encoder number 1 (the master) M1/154 follows the demand signal from the motion controller 155 command position sequencer 150. The signal from the motion controller position feedback processor 152 which receives a digital feedback signal from the encoder portion of motor/encoder number 1 is supplied to the summing circuit 156. The summing circuit outputs to the command signal processor 158 a digital signal which is supplied to the amplifier 160 which operates the number 1 motor/encoder. The motion controller command position sequencer receives a signal from the summing circuit 156 which is processed into a demand signal and sent to a second summing circuit 161 which also receives a signal from the position feedback processor 166 which receives a digital feedback signal from the encoder portion of motor/encoder no. 2 (M2/168) and outputs a digital signal. This signal is converted by the second amplifier command signal processor 159 which supplies the signal to the second amplifier 162 which operates motor/encoder number 2 (the slave) 168.

The separation between the mold halves, when the mold carriers are fully retracted (each is at the start position), can be determined and halfway therebetween is the ideal center point of mold movement. The initial step of the feed program is for the Command Position Sequencer 150 to define a displacement profile that will operate the motors (M1, M2), which are electronically geared together, to displace the molds associated with those motors to that ideal center point. To verify that the displacement of both mold carriers has been completed, the velocity of each motor is tested and if the velocity of one motor (MV1) and the velocity of the other motor (MV2) is zero the next step in the feed program will begin with the Command Position Sequencer issuing a velocity profile that will drive both motors at a very slow velocity ($V_s$)—this can be any command that will cause the motors to run). When the actual velocity of each motor again becomes zero, a determination is made to verify that the actual end position of the advanced mold carrier is within an acceptable error (+/− "X" from the ideal center point). The encoder associated with each motor provides data from which the actual end position can be determined. If the mold carriers are acceptably located, the third step of the feed program proceeds with the running of each motor to apply a selected torque for a set period of time ("T1") which can be inputted via a computer. This time period is the time period when the mold halves will be clamped together. When this time runs out, each mold carrier is returned to its "0" or start position. As shown, to return the mold support mechanisms to their start positions, each motor is operated at a slow velocity −VS, with the minus sign signifying rotation in the opposite direction (which can be set—the arrow represents a computer input) for a limited period of time T2 (which also can be set—the arrow represents a computer input) to "crack" the molds before the mold holders are withdrawn to the "O" position at a rapid velocity −VR (an open profile—a constant acceleration segment followed by a constant deceleration segment ending at the start position, for example).

Figure 15A:
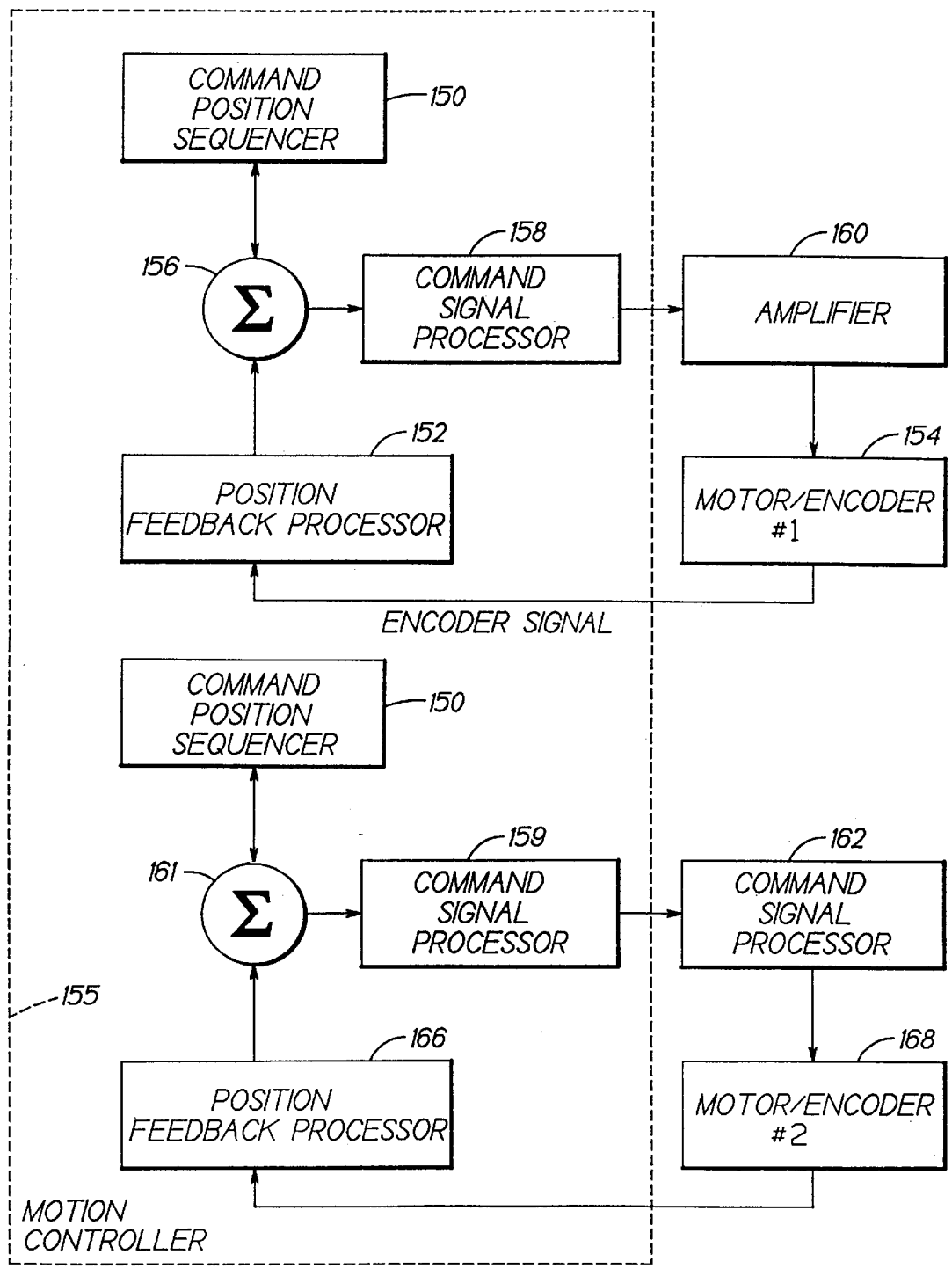
FIG. 15A is an alternate electronic schematic diagram for the drive for a mold opening and closing mechanism.
Figure 16A:
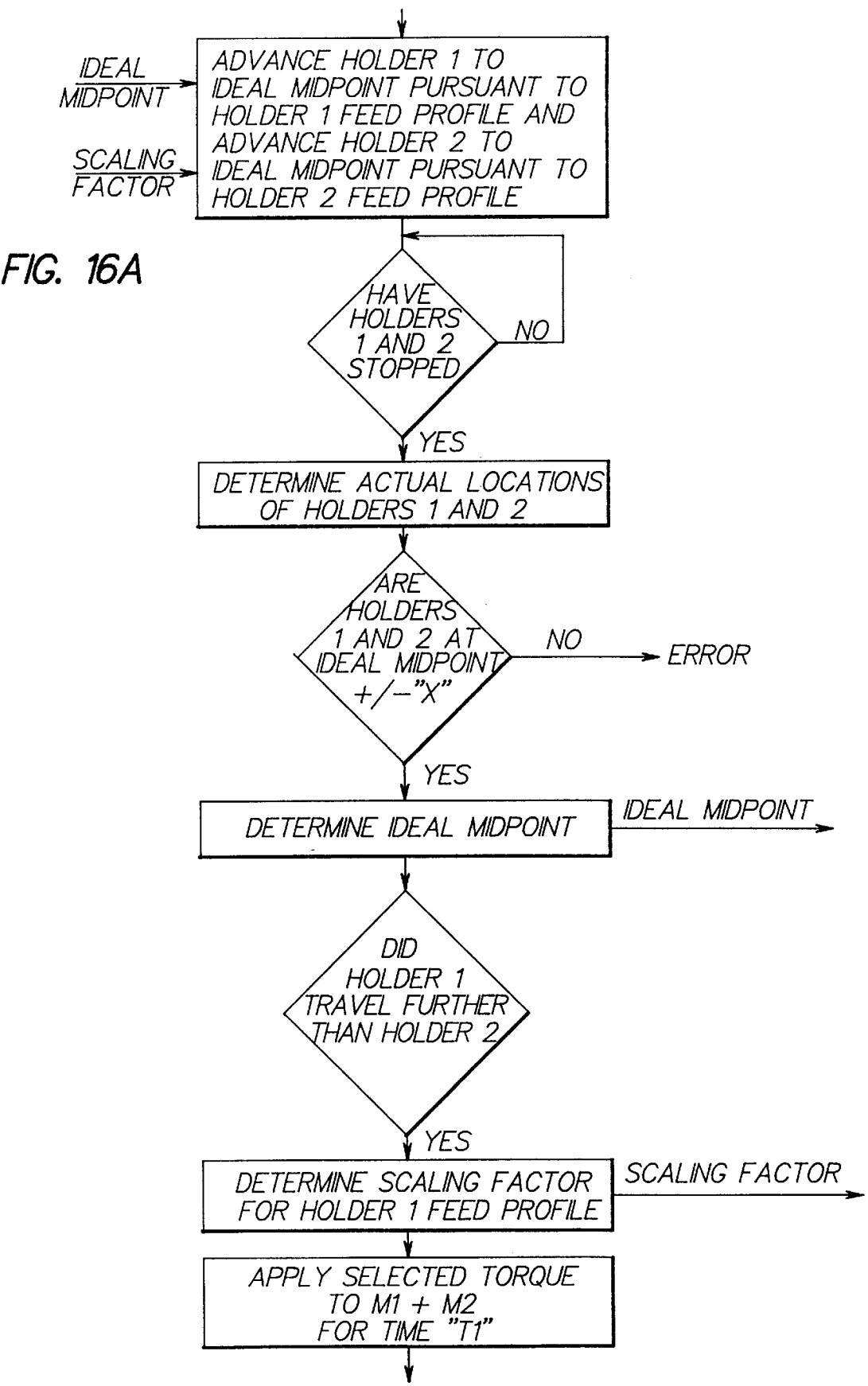
FIG. 16A is a second flow chart illustrating an alternate control algorithm for a mold opening and closing mechanism.

A second algorithm for controlling the two servo motors is shown in FIG. 15A. In this embodiment the Motion Controller includes a Command Position Sequencer for each motor. The motors are accordingly not electronically geared together. As shown in FIG. 16A, each motor is simultaneously operated to displace its associated mold holder, in accordance with a predetermined feed profile (displacement/velocity/acceleration profile) to an ideal center position (one half the total distance plus a selected distance which should result in the opposed mold holders engaging and thereby coming to a stop). The fact that the two mold holders have stopped is verified (the error signal can be monitored) and the actual position of each mold holder is determined and compared to the ideal midpoint position. If the actual position of each mold holder is located +/−X from the ideal midpoint position, infeed is acceptable. If this is not the case an error signal will be produced. The actual midpoint is determined (the total distance traveled by both mold holders divided by two) and defines a new ideal midpoint. If one mold holder traveled farther than the other (more than an acceptable difference) the control will define a scaling factor for the feed profile for one of the motors that will either speed up the displacement or slow down the displacement to reduce the difference in the distance traveled by the two mold holders. The control will then apply the required torque to the motors and continue the program shown in FIG. 16.

Figure 17:
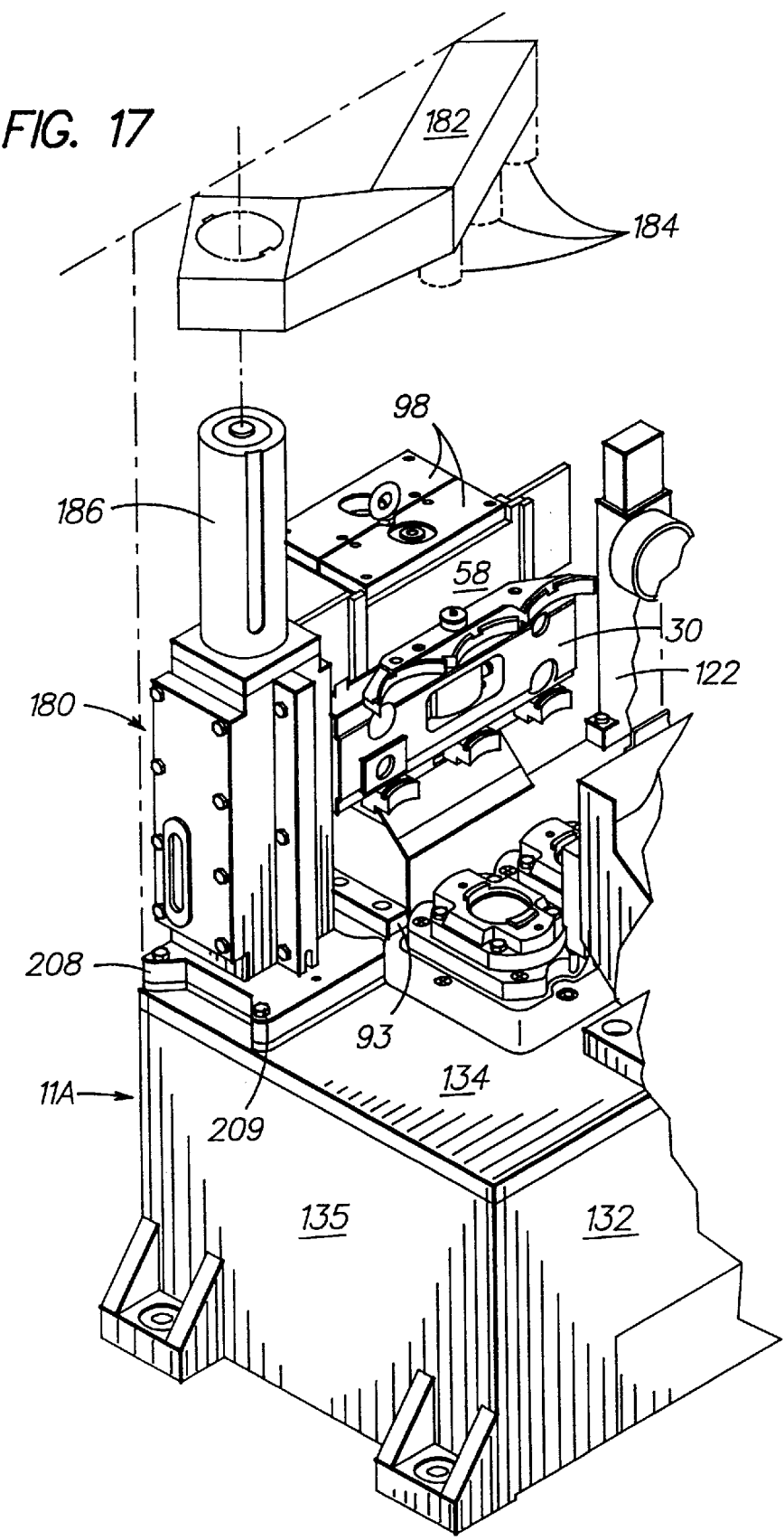
FIG. 17 is an oblique view looking at the blank station end of the section showing a baffle mechanism mounted to the top wall of the section frame at a corner thereof.
Figure 18:
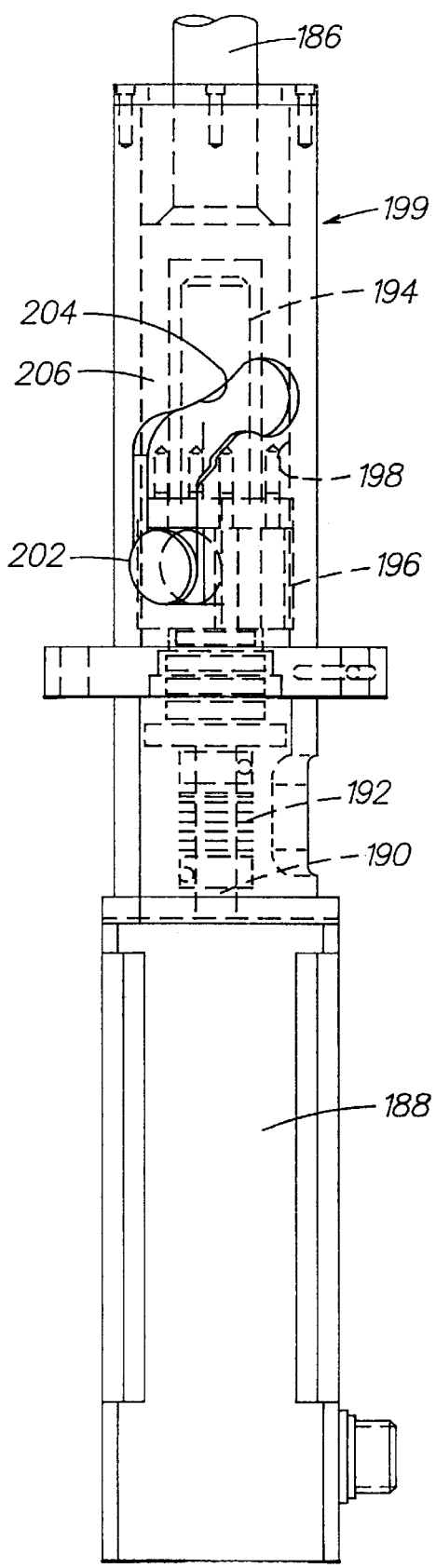
FIG. 18 is a side elevational view of the drive portion of the baffle mechanism shown in FIG. 17.

FIG. 17 shows a baffle mechanism 180 mounted on the top wall 134 of a section frame 11A. A carrier arm 182 which supports three baffles 184 (the baffle mechanism is shown schematically since there are a great variety of specific designs) is connected to a vertical actuating rod 186. This actuating rod will be elevated and rotated during the uppermost portion of its elevation so that the baffles can be displaced between an elevated, retracted position and a lowered advanced position where the baffles will be located on top of the blank molds. This compound displacement is effected by a servomotor 188 (FIG. 18) which has a rotary output 190 which is connected via a coupling device 192 to a screw 194. The screw is threadedly connected to a nut 196 which is free to rotate within a suitable bore 198 in a cam housing 199. A cam follower, in the form of a roller 202 rides in a barrel cam 204 defined in the wall 206 of the cam housing. The vertical actuating rod 186 is mounted on the top of the nut. As can be seen from FIG. 17, the cam housing has a base 208 which is bolted 209 to the top wall 134 of the section frame 11A at a front corner of the section frame defined by a side wall 132 and the front wall 135. At the advanced location, the axes of the baffles are coaxial with the axes of the closed blankmolds and on top of the blankmolds. When the cam is operated the baffles will first partially elevate away from the blankmolds and then while the baffles are elevated the rest of the way, the baffles will be displaced away from the center of the blankmolds so that the invert and neck ring holder mechanism can transfer formed parisons to the blowmolds. The baffle mechanism can be located at the front of the section frame in either corner and unlike conventional baffle mechanisms, the fully elevated and retracted baffle arm can be located fully within the section as shown in FIG. 17 and not overly an adjacent section.

Figure 19:
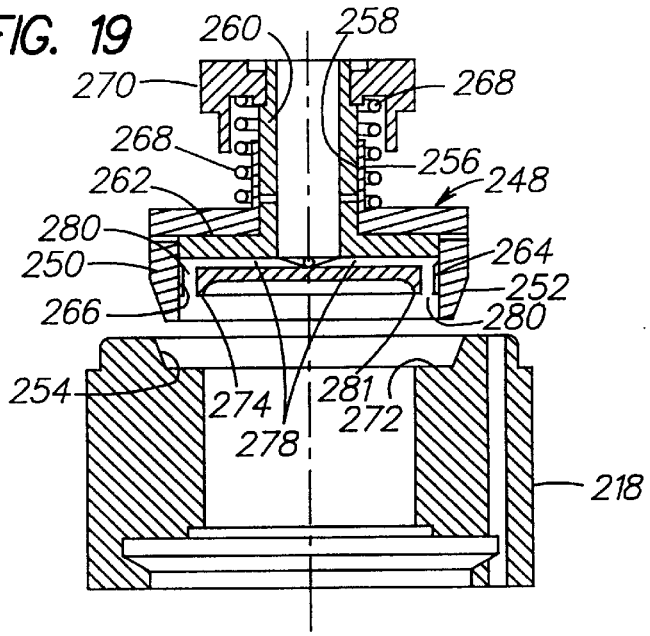
FIG. 19 is an elevational cross sectional view showing a baffle above a blankmold of the I.S. machine.

A baffle (FIG. 19) has a body 248 which includes a cup shaped portion 250 having an annular inclined sealing surface 252 extending around its open bottom for engaging and sealing a corresponding surface 254 at the top of the open blankmold. The body 248 also includes a vertical tubular sleeve portion 256 which defines a cylindrical bearing surface 258 for slidably receiving the rod 260 of a piston element 262. The cylindrical head 264 of the piston element 262 has an annular sealing surface 265 which is slidingly displaceable within the bore 266 of the cup shaped portion 250. A spring 268, which is located around the vertical tubular sleeve portion 256, is compressed between a collar 270 which is releasably secured to the carrier arm and which is secured to the piston rod 260 and the top of the cup shaped portion 250, to maintain the top surface of the cylindrical head 264 in engagement with the adjacent surface of the cup shaped portion when the baffle is separated from the blankmold.

Figure 20:
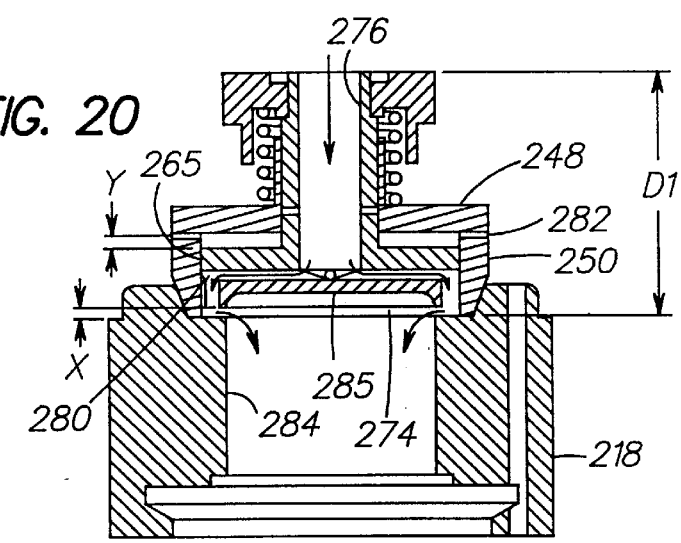
FIG. 20 is a view similar to FIG. 19 showing a baffle engaging a blankmold in a first condition.
Figure 21:
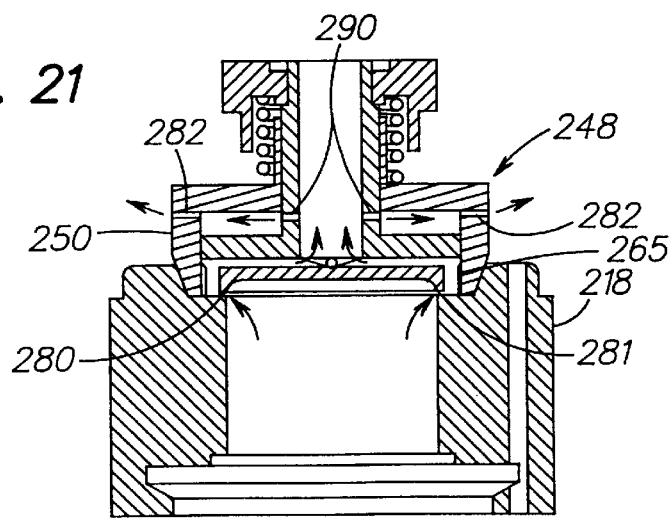
FIG. 21 is a view similar to FIG. 19 showing a baffle engaging a blankmold in a second condition.
Figure 22:
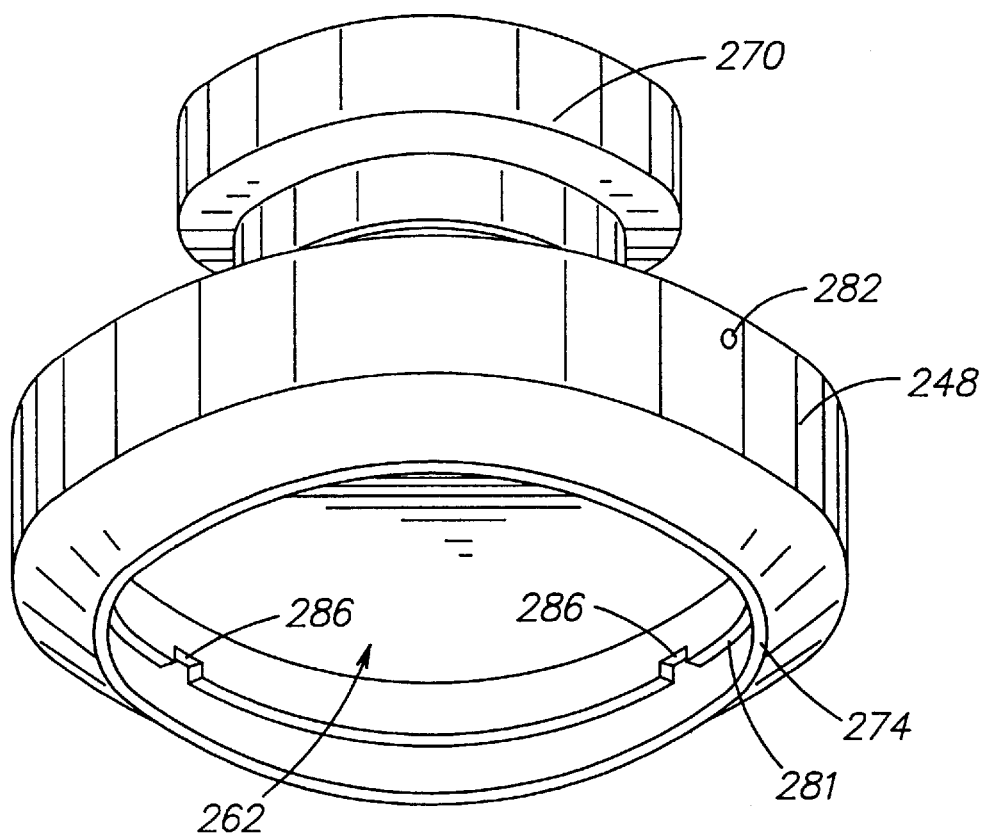
FIG. 22 is an oblique view of a baffle.
Figure 23:
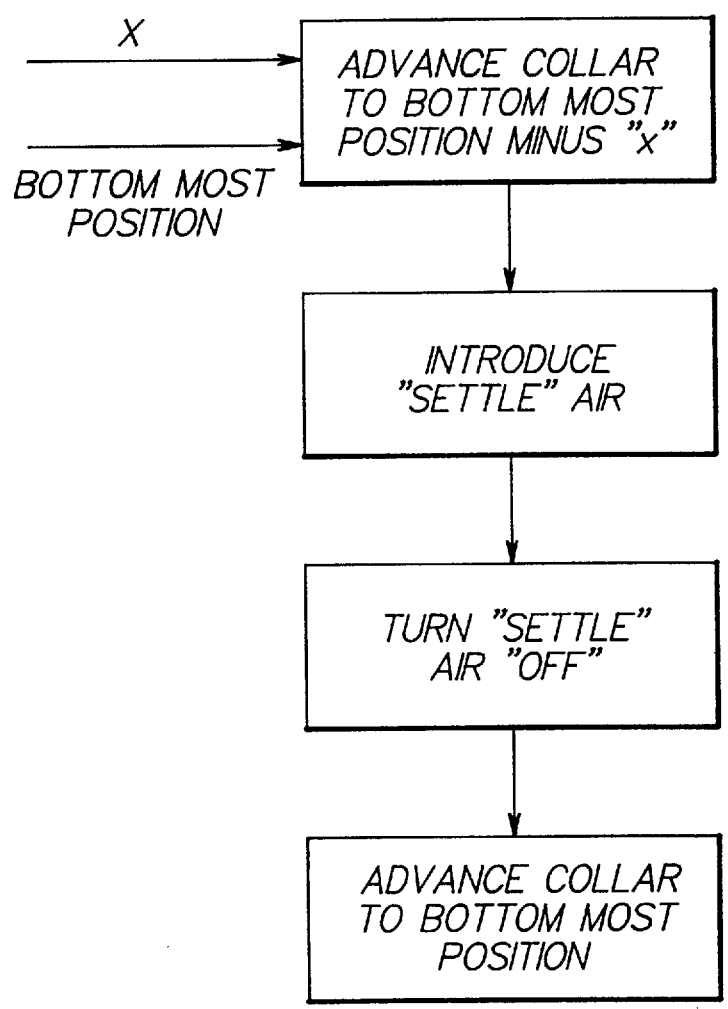
FIG. 23 is a flow chart illustrating the operation of the control for the baffle mechanism.

When the baffle is lowered onto a blankmold as shown in FIG. 20, the control (FIG. 23) will displace the collar 270 downwardly until the top of the collar is located a first distance D1 from the top surface 272 of the blankmold where the cylindrical head will be lowered, relative to the cup shaped portion, to define a desired clearance "X" between the bottom annular surface 274 of the piston cylindrical head and the top surface of the blankmold (the cylindrical head has moved relative to the cup shaped portion a vertical distance "y"). This applies a desired compressive force between the piston element and the blankmold to establish the desired seal between the engaging inclined annular surfaces 252, 254. Now settle air introduced into the blankmold through the central bore 276 in the piston rod will pass through a number of radially extending holes 278 in the cylindrical head into a corresponding number of vertical holes 280 and through the annular gap between the annular bottom surface 281 of the cylindrical head and the top surface 272 of the blowmold into the blankmold (suitable holes 282 which connect the interior of the body to atmosphere assure that the cylindrical head can move smoothly relative to the body). When settle blow is complete and the gob is to be formed into a parison, the collar is displaced until the top of the collar is located a second distance D2 from the top surface 272 of the blankmold. This results in the bottom annular surface 281 of the cylindrical head forcefully engaging the top surface 272 of the blankmold to close the blankmold. As the parison is formed (forced to fill the internal cavity defined by the inner surface of the blankmold and the bottom surface of the cylindrical head) air can escape through a number (four in the preferred embodiment) of small notches 286 defined in the bottom annular surface 281 of the cylindrical head (FIG. 22) into the vertical holes 280, through the radial holes 278 into the piston rod bore 276 and out through now exposed escape bores 290 into the space between the top of the piston and the cup shaped portion 250 and out the relief openings 282.

Figure 24:
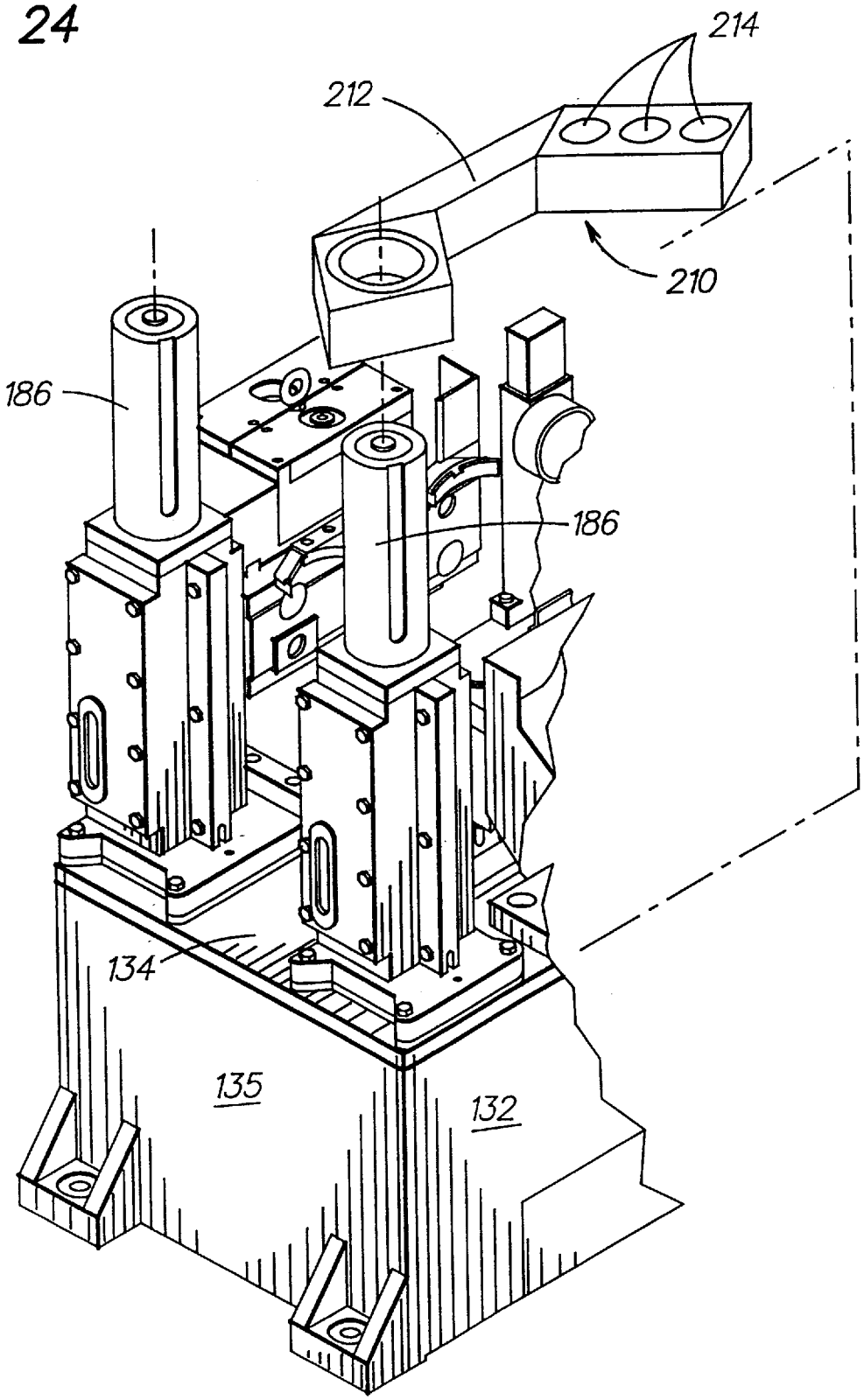
FIG. 24 is a view similar to FIG. 17 showing a funnel mechanism mounted on the section frame.

When a funnel mechanism 210 is required it can be mounted in the other front corner. As can be seen from FIG. 24, the baffle and funnel mechanisms are identical except for the direction of the barrel cam and except that a funnel carrier 212 supporting three funnels 214 is mounted on the other actuator rod. The funnel mechanism, like the baffle mechanism, can be always located within the territory of its own section.

Figure 25:
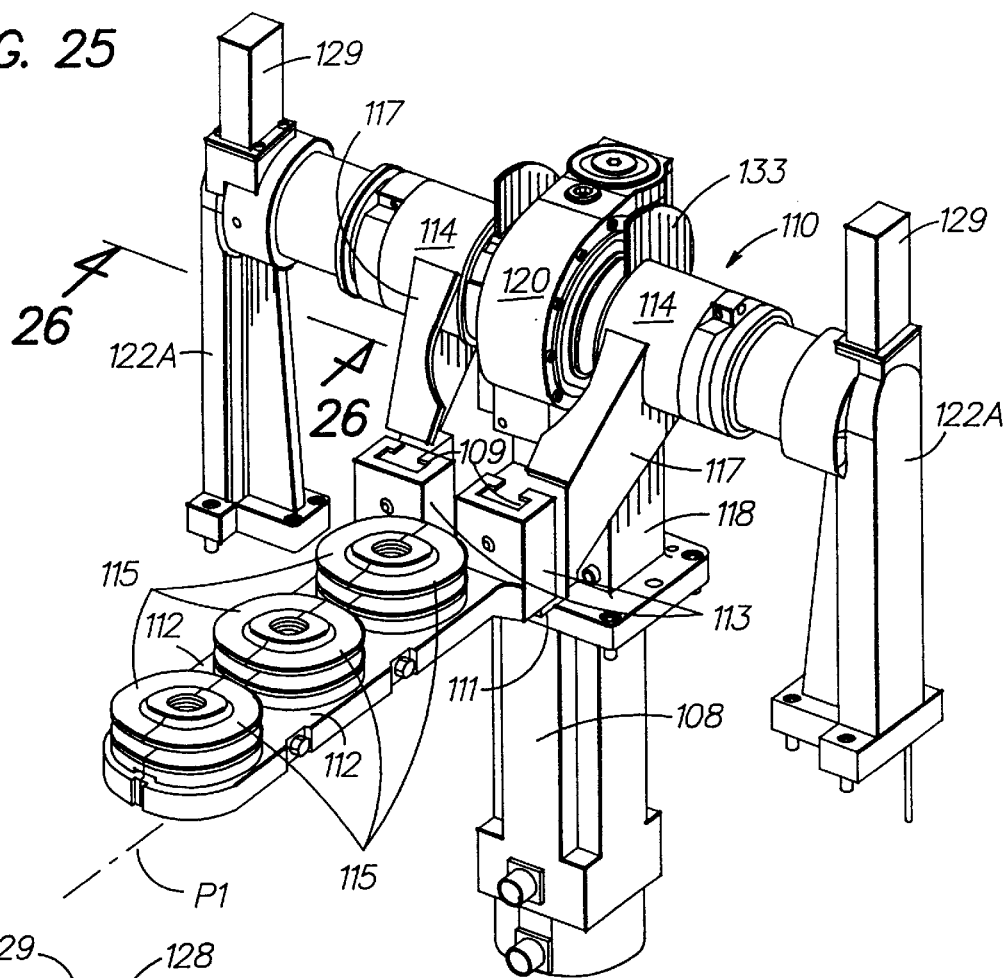
FIG. 25 is an oblique view of an alternate embodiment of an invert and neck ring holder mechanism for use with the mold opening and closing mechanism shown in FIGS. 9 and 10.
Figure 26:
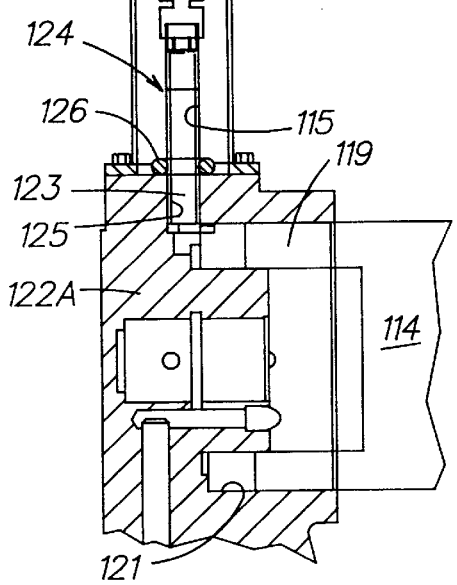
FIG. 26 is a view taken at 26—26 of FIG. 25.
Figure 27:
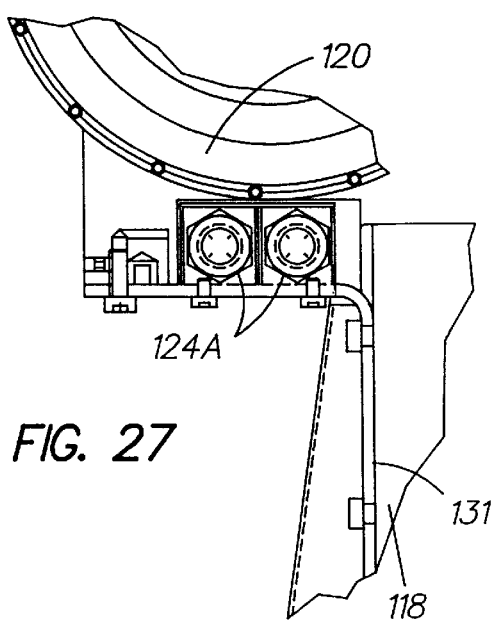
FIG. 27 is an axial view of the juncture of the worm gear housing and the motor housing.

FIG. 25 illustrates an alternate invert and neck ring holder mechanism 110. As shown, this invert and neck ring holder mechanism can be used with the embodiment shown in FIGS. 8–10. The end of each neck ring holder adjacent the worm gear housing 120 ends in a slotted mounting bracket 113 which is slidingly received by the keyed end 109 of a support bracket 117 secured to an invert cylinder 114. The annular outboard end 119 of a cylinder 114 (FIG. 26) slides within a corresponding annular groove 121 in the top of the related outboard side bracket 122A. The threaded end 123 of a proximity switch or sensor 124 is threaded into a suitable bore 125 in the side bracket and secured by a nut 126 at the location where it will sense the cylinder at its fully inserted position (neck ring holder retracted). The proximity switch cable 128 extends downwardly through a hole (not shown) in the side bracket and the proximity switch is protected by a cover 129. An additional pair of proximity switches 124A (FIG. 27) are mounted on a bracket 131 which is secured to the worm housing 118. These proximity switches are located beneath the worm gear housing 120 with one facing each cylinder. Secured to the end of each cylinder, proximate the worm gear housing, is a semi circular target 133 which will operate an associated one of these proximity switches when that cylinder is located against the worm gear housing from the location where the neck ring holder is at a first orientation whereat the neck ring halves carried by the neck ring holder are on top of the plunger mechanism (the 180° invert start position) to a second orientation (about 180° away from the first orientation) whereat the neck ring halves are holding parisons at the blow station (the 0° invert end position). Hereinafter, the phrases neck ring closed and neck ring open will be used to describe the position of the neck ring holder/bracket/cylinder and the controls will be described with reference to one neck ring holder but the other neck ring holder is controlled in the same manner. Since the servo motor 108 has an encoder which generates a position feedback, the angular position of the neck ring holder is known throughout its angular displacement.

Figure 28:
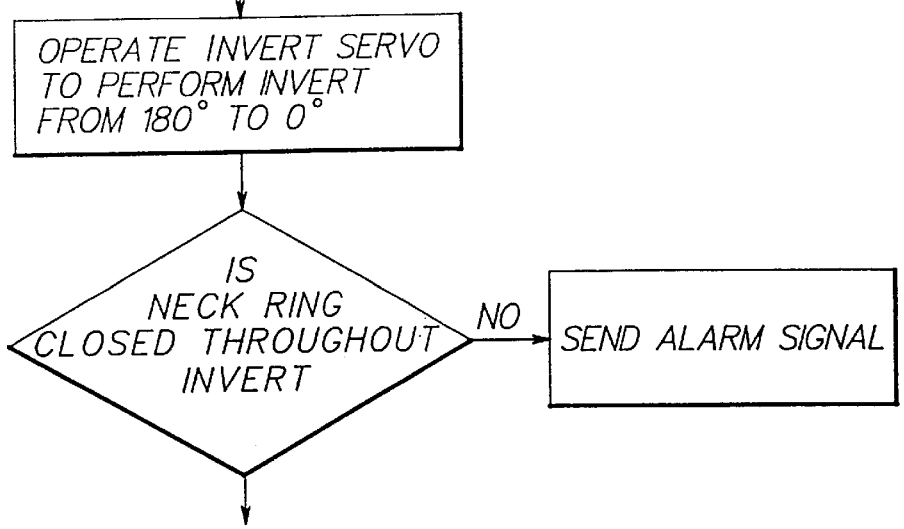
FIG. 28 is a flow diagram illustrating the invert algorithm.

The algorithm illustrated in FIG. 28 will identify operational problems during invert. The status of the neck ring closed sensor 124A will be continuously monitored as the invert servo 108 advances the worm to rotate the gear and the neck ring from the start invert location (180°) to the end invert location (0°). Should the neck ring not maintain its closed position throughout this 180° displacement, an alarm signal will be sent. This signal could either stop the cycle or initiate any desired lesser action.

Figure 29:
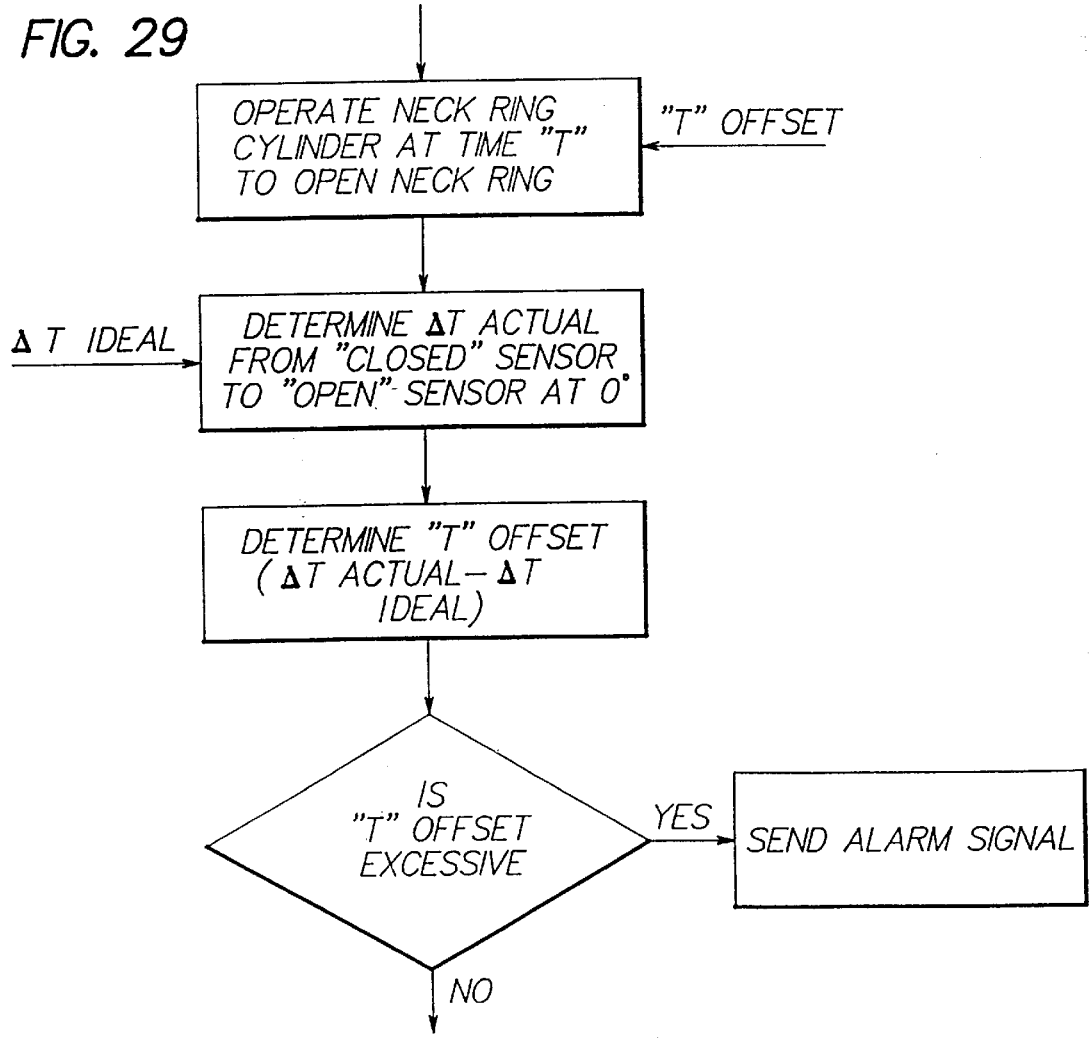
FIG. 29 is a flow diagram illustrating the neck ring open algorithm.

The algorithm illustrated in FIG. 29 will assure that the time of arrival of the neck ring at the open position will be constant. The neck ring cylinder will be operated at a set time in the cycle (time T) to displace the neck ring from the closed position sensed by sensor 124A on the gear housing to the open position sensed by sensor 124 on the end bracket. The time between these two signals is timed "ΔT" and compared to an ideal time difference (the original time difference) and a time ("T") offset, which is the difference between the actual and ideal time difference, is supplied to the control which operates the neck ring cylinder. In the event that the "T" offset becomes excessive or erratic, an alarm signal will be issued to effect any desired consequence from cycle stoppage, to an operator warning that maintenance is required.

Figure 30:
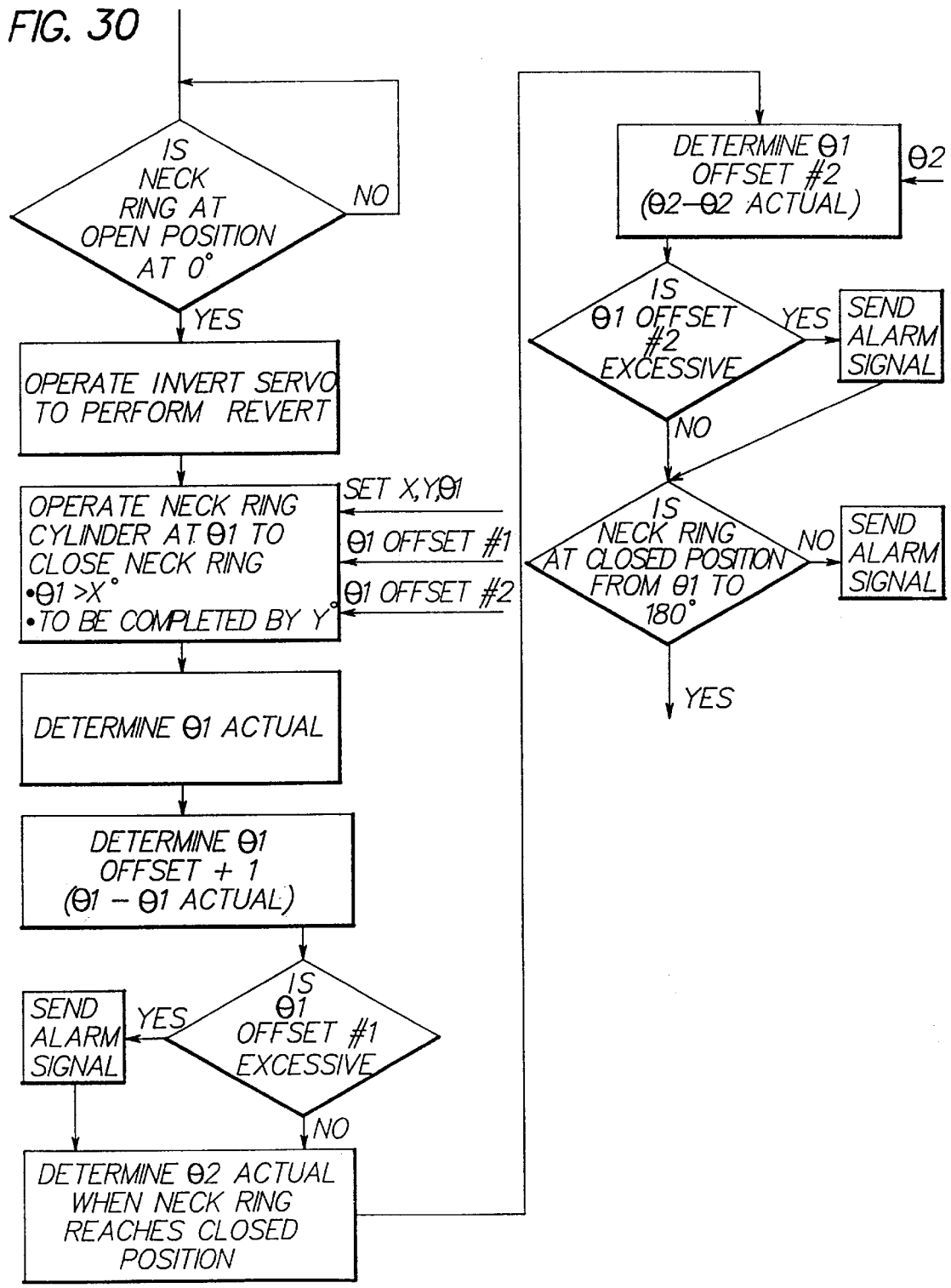
FIG. 30 is a flow diagram illustrating the revert algorithm.

FIG. 30 illustrates the revert algorithm. The neck rings will be opened at the blow station to release a completed bottle and before the arm can be rotated 180° to the blank station, the control must verify that the neck ring is at the open position. With such verification, the invert servo will be operated to effect the desired angular displacement. At a selected angle of rotation ($\theta 1$ ideal) the control will operate the neck ring cylinder to displace the cylinder (the neck ring) from the open position to the closed position. Such action will be confined by limits including the limits that $\theta 1$ has to be greater than X° and that the movement of the neck ring must be complete by Y°. X, Y, and $\theta 1$ are individually setable. The control determines the actual angle ($\theta 1$ actual) when the neck ring open sensor 124 is switched off and determines a $\theta 1$ offset #1 by subtracting $\theta 1$ actual from $\theta 1$ ideal. This offset is supplied to the control to correct the location where the neck ring cylinder is operated. When this offset becomes excessive or erratic an alarm signal is sent.

The control additionally monitors when the neck ring reaches the closed position determining the angle $\theta 2$ actual when the neck ring closed sensor 124A senses the neck ring. The cylinders are conventionally air operated and the time for a cylinder to be pneumatically displaced from the neck ring open position to the neck ring closed position can depend on the condition of the pneumatic cylinder. As the operation of the cylinder degrades, it can take longer for the desired displacement to take place and such lateness may cause the moving structure (the neck ring structure) to impact the blank molds that normally would be out of the way. The control determines a second $\theta 1$ offset ($\theta 2$ ideal–$\theta 2$ actual) and makes a second correction to the angle when the neck ring is operated. When this degradation reaches a selectable angle indicative of the need for action, the control will issue a suitable signal indicating that repair and/or maintenance is in order. Since each angular displacement of the encoder is a function of time, these offsets could be correlated to tracked differences of time. These offsets assure that cycle events occur at constant times.

Figure 31:
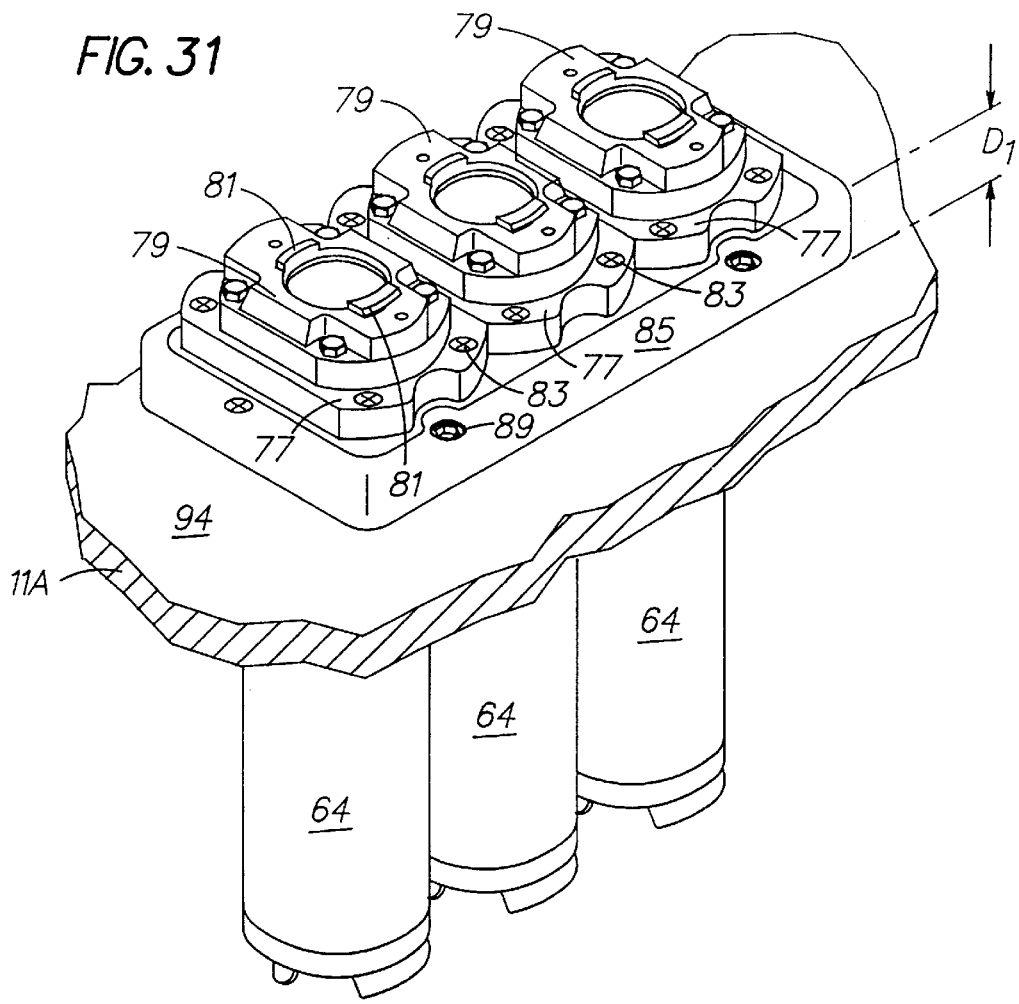
FIG. 31 is an oblique view of a the blank station plunger mechanism shown partially in FIG. 17.
Figure 32:
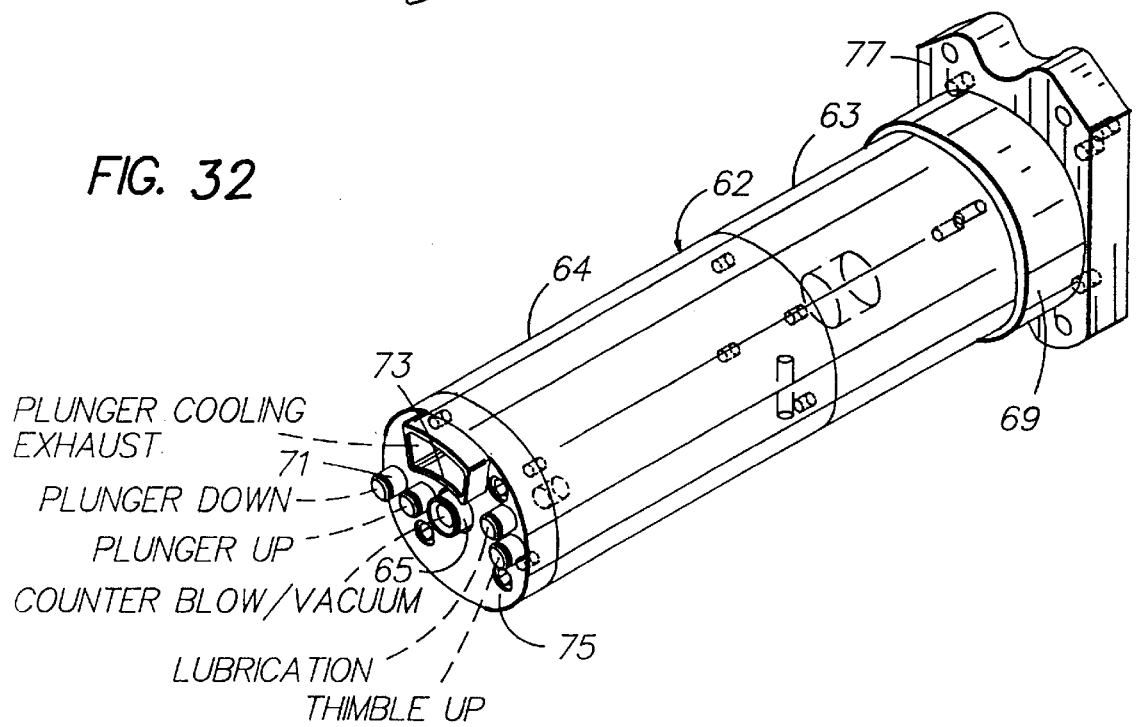
FIG. 32 is an oblique view of a single plunger canister.

A plunger mechanism, which is part of the blank station of a section, is shown in FIGS. 31 and 32, and includes three plunger canisters 62, as shown, where the machine is a triple gob machine. Each plunger canister has an upper cylinder portion 63 and a lower cylinder portion 64 with plugs 65 supporting "O" ring seals 71 and an exhaust duct 73 extending axially downwardly from the bottom surface 75 of the lower cylinder to connect the plunger canister to required services (plunger cooling, exhaust, plunger down, plunger up, counterblow/vacuum (in blow and blow machines) or plunger cooling (in press and blow machines), lubrication, separate thimble up). The canister may exhaust through the upper cylinder and in that case the exhaust duct and associated ducting shown would not be required. For clarity the plunger mechanism will be described in a blow and blow machine but where counterblow/vacuum is described it should be understood that this would be plunger cooling in a press and blow machine. Secured to the top of each upper cylinder is a mounting plate or flarge 77 and tooling 79 which has opposed ears 81 to capture the opposed neck ring halves as the neck ring holders are closed. These mounting plates 77 are secured with suitable fasteners 83 to the top surface of a mounting block or plate 85 which has holes 87 (FIG. 33) through which the upper/lower cylinders can pass and the mounting block is fastened to the top surface 94 of the section frame 11 with suitable bolts 89. On the top portion of the upper cylinder is located a locating diameter 69. The top surface of the section frame has a large opening (not shown) which can accommodate the plunger cartridges whether single, double or triple gob. The top surface 94 of the section frame is accordingly the master surface. It is preferably machined, at the location where the mounting block is to be secured, to define a precisely horizontal mounting pad. The top (or an area or pad on which the flanges are to be mounted) and bottom surfaces of the mounting block preferably are machined to be parallel and the height of the mounting block is defined to locate the tooling at the desired height. By also defining the mounting block cylindrical openings 87 to matingly receive the locating diameter of the plunger canisters, the axes of these plunger canisters will be precisely located upon insertion. By locating diamond and round pins not shown) on the top wall of the section frame and defining suitable holes in the bottom surface of the mounting plate, the mounting plate will be automatically located. Since the top of the plunger canister is secured to the top wall of the section frame, growth resulting from heat will not significantly vary the location of top of the tooling.

The first four fluid ducts underlying the blank side of a section (FIG. 34) are pneumatic services for plunger down (duct 300—approximately 3.1 Bar), counterblow (duct 302—approximately 2–3 Bar), vacuum (duct 304) and plunger up (duct 306—approximately 1.5–2.5 Bar). Connection of these services, via holes 307 in the top wall of the ducts, is established to vertical inlets 308 in the bottom surface 310 of a plunger distribution base 312 via corresponding holes 314 in a connection plate 316. The four pneumatic services are routed through the plunger distribution base to outlet ports 320 in the front face 321 of the plunger distribution base. A fifth fluid duct 301 underlying the bottom wall of the blank station of a section (FIG. 34) carries pressurized lubrication fluid. The lubricant passes through a hole 303 in the top wall of the lubrication duct, through a hole 311 in the connection plate and into a lubrication inlet 305 in the bottom surface of the plunger distribution base which supplies the lubrication via an outlet port 309 on the front face. Effective sealing is achieved with "O" rings 318 compressively located between either surface of the connection plate 316 and the top surface of the ducts and the bottom surface 310 of the plunger distribution base when the plunger distribution base is bolted onto the bottom wall of the section frame. A cross hole 322 is defined in the plunger distribution base for receiving a crank 323 operated isolation rod (valve) 324 which can be rotated from an open orientation where the pneumatic services and lubrication can flow through holes 325 to the outlet ports, to a closed orientation where such flow is blocked.

Figure 36:
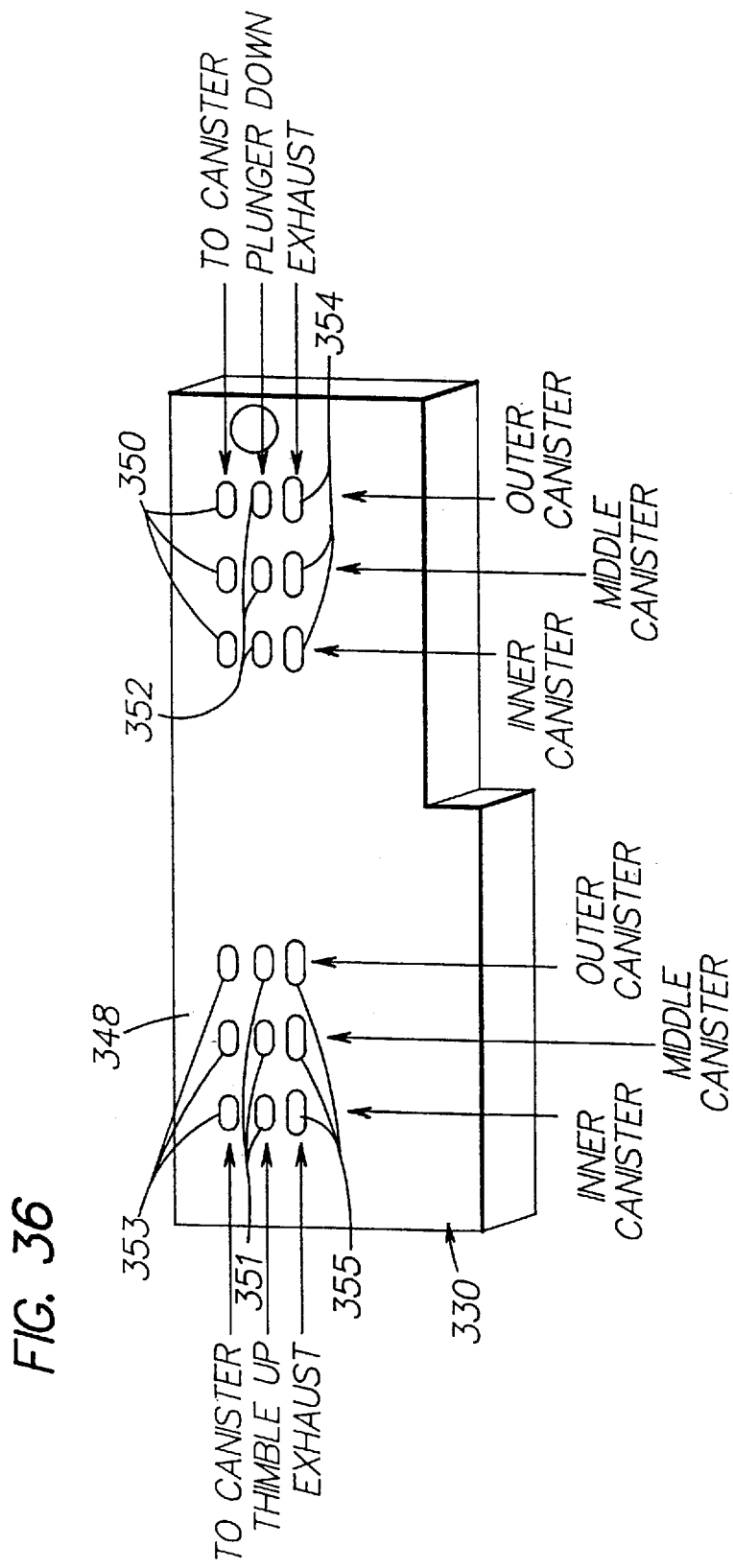
FIG. 36 is an oblique view of the top surface of the conjunction box.
Figure 37:
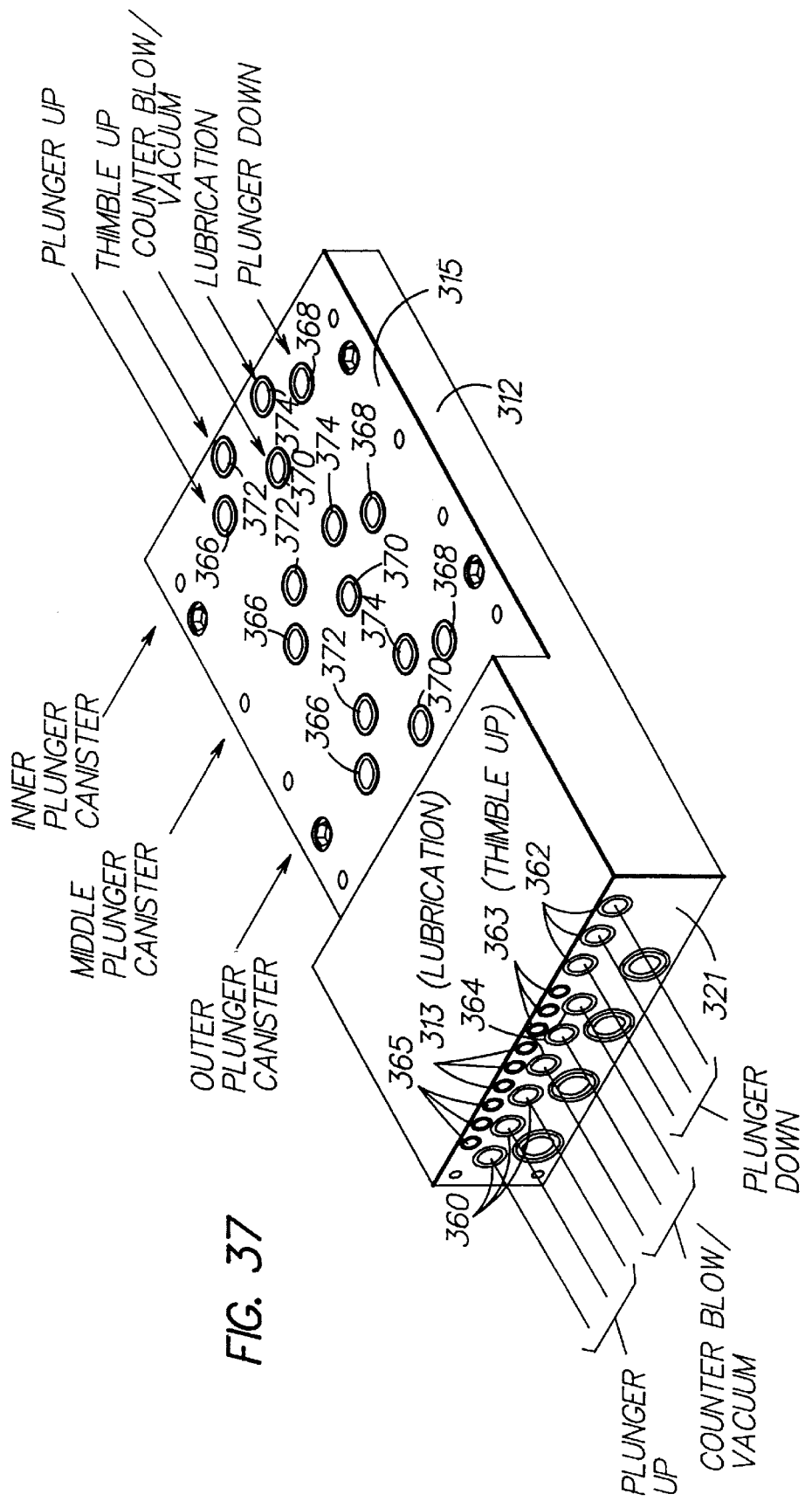
FIG. 37 is an oblique view looking at the top and front faces of the plunger distribution base.

Connected to the front face 321 of the plunger distribution base is a conjunction box 330 (FIG. 35) which includes five service inlet ports (320A, 309A) on the rear face which communicate with the service outlet ports 320 and 309 of the plunger distribution base ("O" rings 326 provide the sealing). The illustrated embodiment is a triple gob configuration which means that the blank station of each section includes three plunger canisters such as shown in FIG. 32, i.e., an inner plunger canister (the one nearest the invert and neck ring holder mechanism axis), a middle plunger canister and an outer plunger canister. Each individual pneumatic service input (plunger up, vacuum, counterblow, plunger down) and the lubrication line is split in the conjunction box into three outputs, one for each of the three plunger canisters. On the left portion of the front face 332 of the conjunction box are located, for the inner, middle and outer plunger canisters (the vertical arrows, "inner canister", etc., in FIG. 35, identify vertically arranged groups of ports on the front face that are associated with a particular canister and the horizontal arrows, "to canister", etc., identify horizontal groups of ports that are associated with a particular function), three outlet ports 334 for the plunger up service, which originate with the single plunger up inlet port, three exhaust ports 336 which communicate with exhaust and three "to canister" inlet ports 338 which communicate with three corresponding outlet ports defined in the rear face of the conjunction box (not shown) which communicate with corresponding "plunger up" inlet ports 360 defined in the front face 321 of the plunger distribution base (FIG. 37). Flow for each vertically arranged group of ports on this left portion of the front face may be controlled by a device which can regulate the pressure such as regulator/valve and receiver tank (not shown for clarity) which will either connect the "to canister" line to plunger up service or to exhaust. On the right portion of the front face of the conjunction box (FIG. 35) also are located, for the inner, middle and outer plunger canisters, three service outlet ports 340 for vacuum, each originating with the single vacuum inlet port, three counterblow outlet ports 342 each originating with the single counterblow inlet port for counterblow service services, three "to canister" inlet ports 344 which communicate with three corresponding outlet ports defined in the rear face of the conjunction box which communicate with corresponding "counterblow/vacuum" inlet ports 364 defined in the front face 321 of the plunger distribution base (FIG. 37) and three exhaust ports 346 communicating with exhaust. Here a regulator and valve (not shown) operates in conjunction with a pilot operated valve (not shown) to connect the "to canister" inlet ports either to vacuum or counterblow or to exhaust. Located on the right side of the top face 348 of the conjunction block (FIG. 36) are, for the inner, middle and outer plunger canisters, three plunger down service outlet ports 352 which originate with the single plunger down inlet port for plunger down service, three inlet ports 350 communicating with three corresponding outlet ports defined in the rear face of the conjunction box which communicate with corresponding "plunger down" inlet ports 362 defined in the front face 321 of the plunger distribution base (FIG. 37) and three exhaust ports 354 which communicate with exhaust. The flow of each vertical group of ports is controlled by an individual regulator and valve (not shown for clarity) which will either connect the "to canister" line to plunger down service or to exhaust. Located on the left side of the top face 348 of the conjunction block are, for the inner, middle and outer plunger canisters, three thimble up service outlet ports 351 for the thimble up service which communicate with a plunger down line, three "to canister" inlet ports 353 communicating with three corresponding outlet ports defined in the rear face of the conjunction box which communicate with corresponding "thimble up" inlet ports 363 defined in the front face 321 of the plunger distribution base (FIG. 37) and three exhaust ports 355 which communicate with exhaust. The flow of each vertical group of ports is controlled by an individual regulator and valve (not shown for clarity) which will either connect the "to canister" line to thimble up service or to exhaust. The conjunction box also splits the lubrication line into three lines which supply three lubrication input ports 313 (FIG. 37) on the front face of the plunger distribution base.

Referring to FIG. 37, the front face of the plunger distribution base also includes a number of additional inlets 365 for additional fluid functions such as neck ring cooling, take out tong closing, cooling air, neck ring open/close, etc., which connect with corresponding conduits in the conjunction box. These conjunction box lines can connect to outlets in the top surface of the conjunction box (not shown) which are connected to corresponding outlets in a corresponding number of individual regulators and valves (not shown for clarity) which distribute air from the plunger down line, regulated to the desired pressures.

The top surface 315 of the plunger distribution plate has three sets of outlet ports each having a plunger up outlet port 366, a plunger down outlet port 368, a counterblow/vacuum outlet port 370, a thimble up outlet port 372 and a lubrication outlet port 374. These outlet ports are universal (permanent), i.e., the number of sets of outlet holes corresponds to the maximum number of gobs to be processed in the section.

Figure 38:
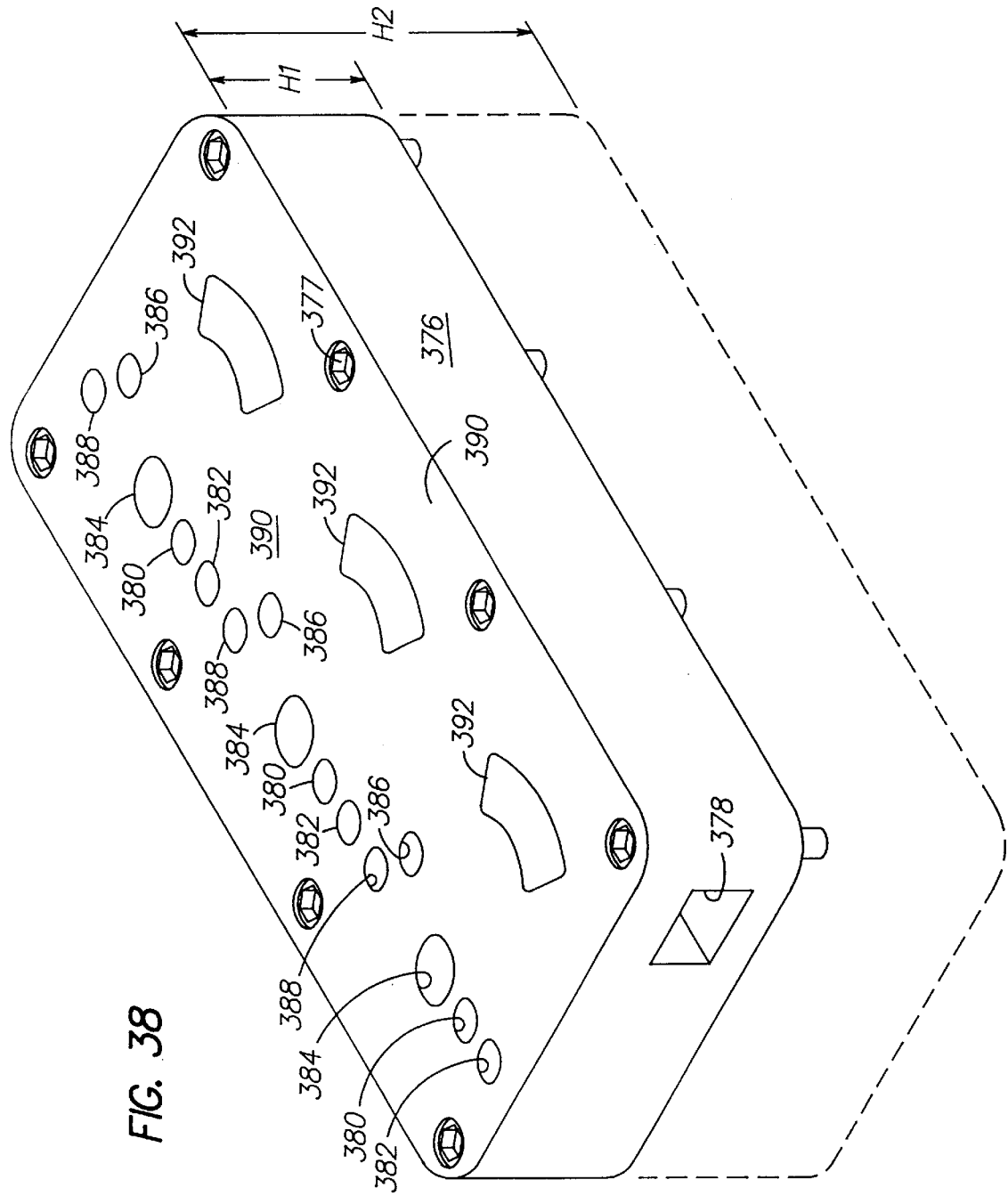
FIG. 38 is an oblique view of the plunger transition plate.

To define a specific plunger configuration (single, double or triple gob) and to define a defined plunger spacing (5¼", 6" for example), in the event there are multiple plungers, a transition plate 376 (FIG. 38) is secured to the top surface 315 of the universal plunger distribution plate via suitable bolts 377. The transition plate has, for each canister, a plunger up outlet hole 380, a plunger down outlet hole 382, a counterblow/vacuum outlet hole 384, a thimble up outlet hole 386 and a lubrication services outlet hole 388 in the top surface 390 for receiving the downwardly projecting connecting stubs 65 on the plunger canisters (an "O" ring 71 establishes the seal between a downwardly projecting stub and its receiving hole—any movement of a plunger canister, either within its mounting plate hole or as a part of the mounting plate, will not result in the tilting of the canisters since sufficient float is assured via the "O" ring seals on the receiving holes of the transition plate) and a plunger exhaust hole 392 is shaped to receive the depending plunger exhaust pipe 73 of a plunger canister. The plunger exhaust holes communicate with a discharge opening 378.

Figure 38A:
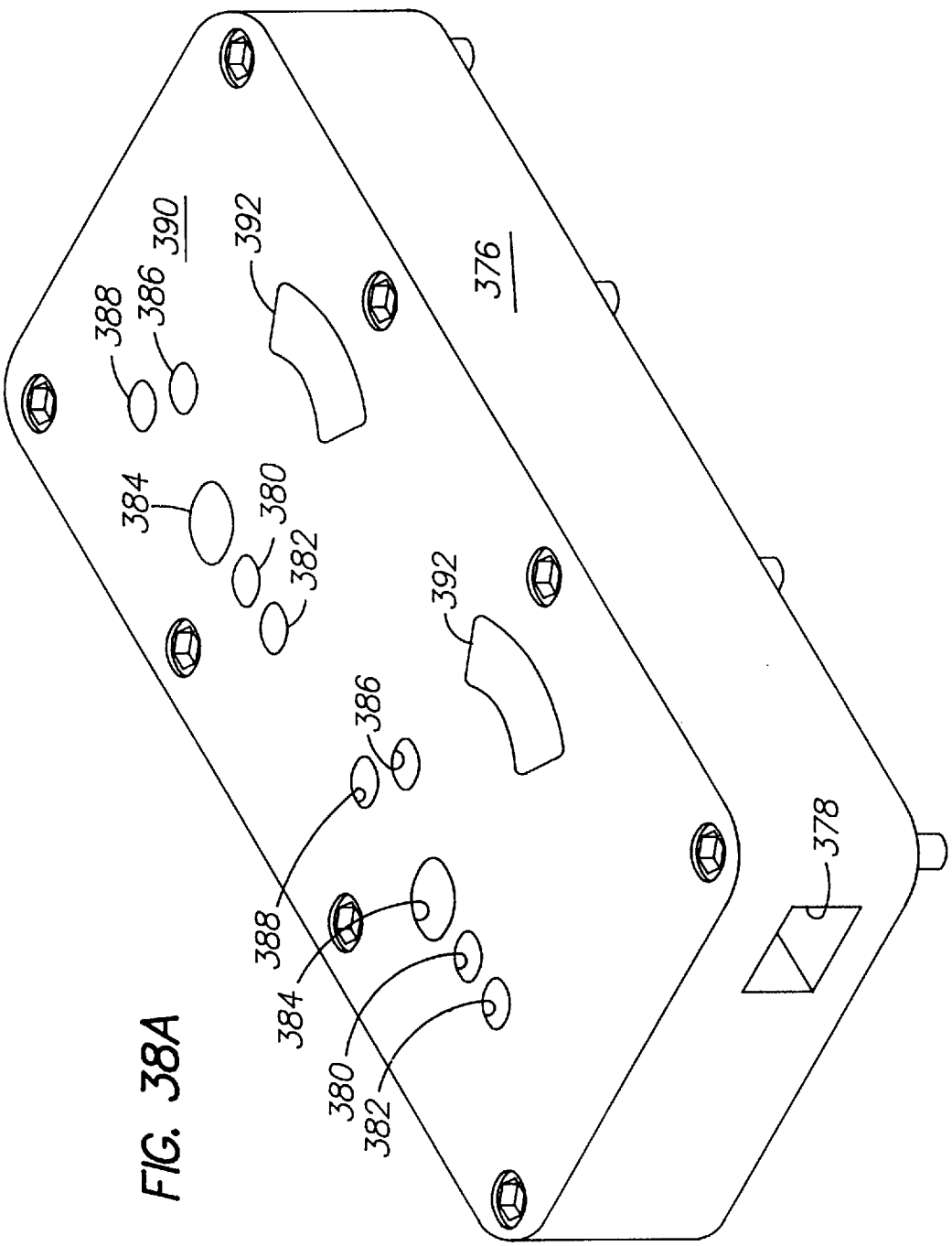
FIG. 38A is a view similar to FIG. 38 showing an alternate plunger transition plate.

To change the section from one configuration to another, i.e., to change from the illustrated triple gob operation to double gob operation, for example, the illustrated triple gob transition plate will be removed and replaced with a double gob transition plate (FIG. 38A) which will seal off one of the three sets of plunger output ports on the top surface of the plunger distribution plate while establishing connections to the third set of ports (the plunger mechanism control will be modified so that only the valves, etc. associated with the two sets of ports in the transition plate will be operated).

Figure 39:
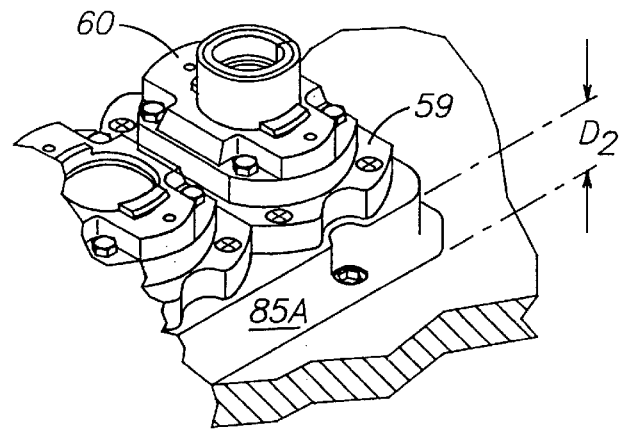
FIG. 39 is a view similar to FIG. 31 showing an alternate mounting plate.
Figure 40:
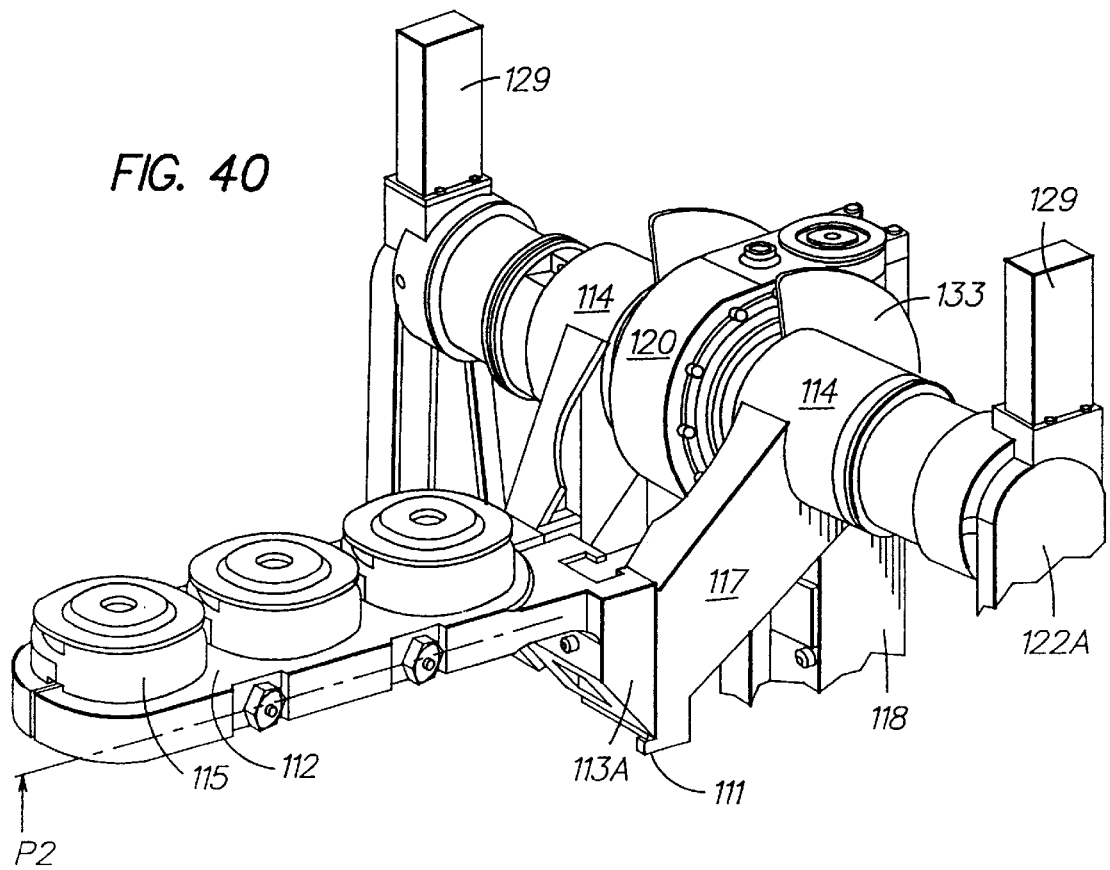
FIG. 40 is an oblique view of a portion of an neck ring holder having an alternate configuration.
Figure 41:
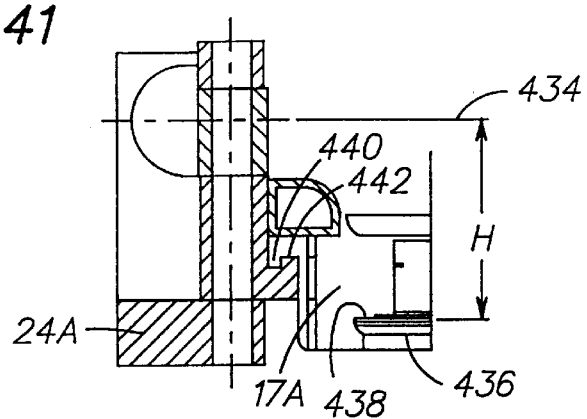
FIG. 41 is a side elevational view of a first mounting assembly showing a first mold half supported by a mold support insert.
Figure 42:
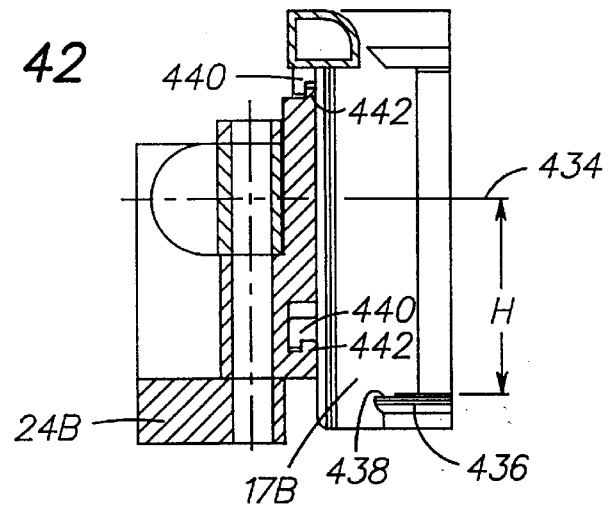
FIG. 42 is a side elevational view of a second mounting assembly showing a second mold half supported by a mold support insert.
Figure 43:
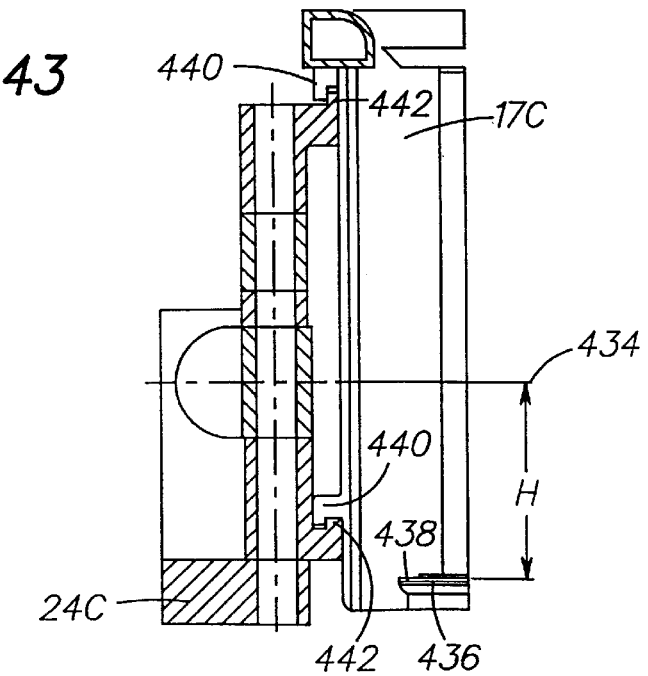
FIG. 43 is a side elevational view of a third mounting assembly showing a third mold half supported by a mold support insert.
Figure 44:
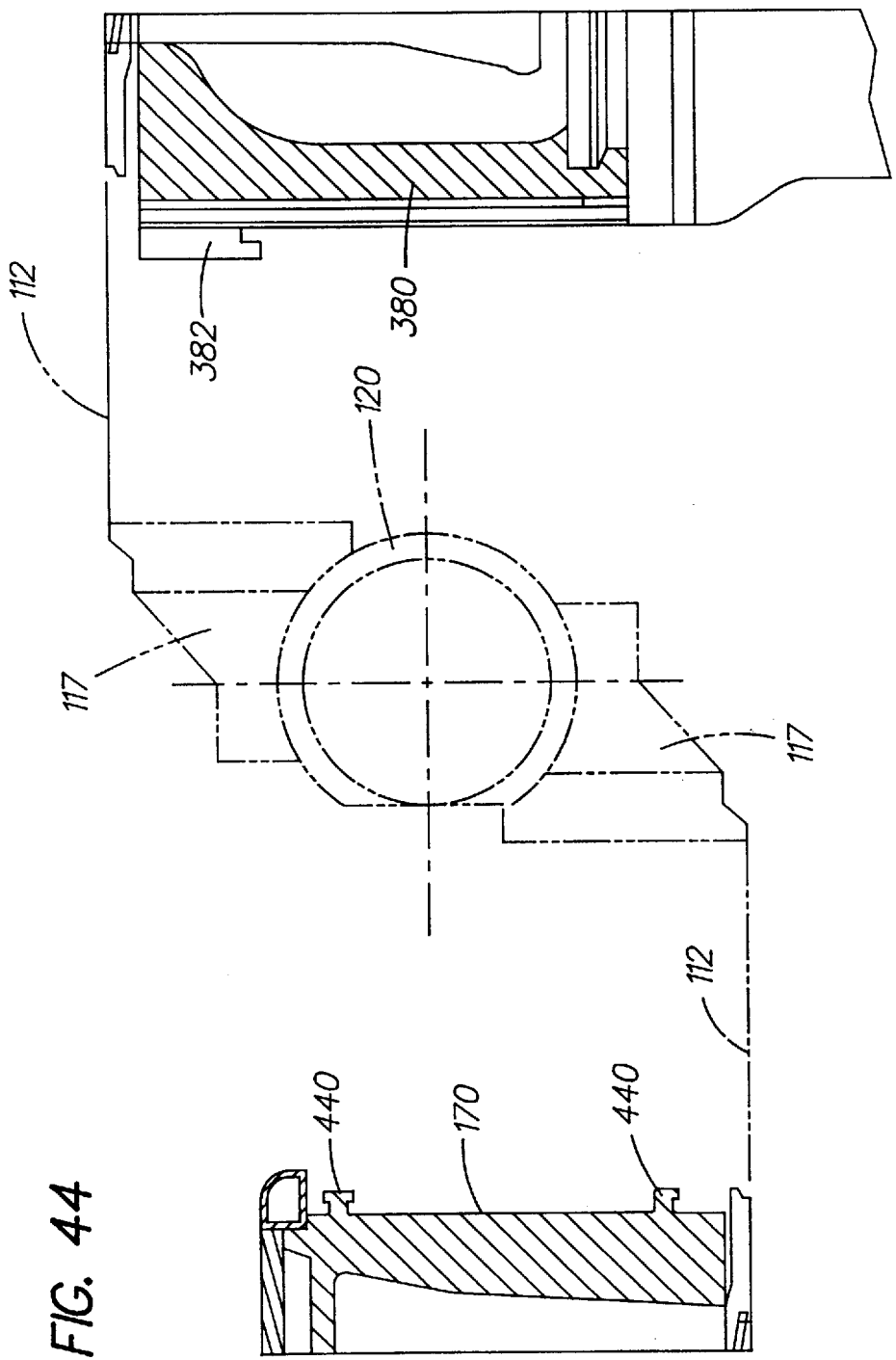
FIG. 44 is a schematic side elevational view showing a blankmold supported at a blank station and a blowmold supported at the corresponding blow station.

To accommodate the manufacture of bottles having a substantial height variation, the neck rings/plunger canister (s) can be elevated by approximately 70 mm. The original transition plate having a height H1 and the mounting plate having a thickness D1 can be replaced with a transition plate and mounting plate each having a height increased by 70 mm (H2—FIG. 38 and D2—FIG. 39, respectively) and the neck ring holder can be replaced with alternate arms wherein the mounting bracket 113A elevates the neck ring holder 112 70 mm from position P1 (FIG. 25) to position P2 (FIG. 39). The fixed stop 111, which locates the mounting brackets, is shown in FIG. 40. As can be seen from FIGS. 41–43, the machine, with a given pair of neck ring holders, can use blankmolds having a wide range of heights to produce bottles having a wide range of heights. While the blankmold half 17A, 17B, 17C, 17D (FIGS. 41–43) and the insert can take various forms, the interconnection of the blankmold half and the insert is defined to establish a fixed vertical dimension "H" between the invert center 434 and the top surface 438 of the blankmold halve neck ring groove 436 (the top surface of the neck ring). For a neck ring holder located at P1 (FIG. 25), this dimension could for example be 100 mm whereas this dimension could for example be 30 mm when the neck ring is located at P2 (FIG. 40). Each blankmold half has a downwardly projecting annularly extending hook shaped lip 440 proximate the bottom surface which can have a number of annular portions or segments and which is received by a corresponding upwardly projecting annularly extending hook shaped lip 442 in the outer wall of the insert which vertically locates the blankmold halves (the blankmold is vertically located at the horizontal plane of engagement between the downwardly projecting blankmold lip and the upwardly projecting lip of the mold support insert). The blankmold half may be of sufficient size that a stabilizing button 442 may be required vertically above the lower lip which operates with an upper mold half lip 440 to stabilize the mold during its movement (as shown, the stabilizing button 442 does not support the weight of the blankmold half). Since the blankmold halves are supported proximate the neck ring groove at the location where the mold lip is supported by the lip on the mold support, substantially all growth of the blankmolds due to heat will occur upwardly from this location and any growth from this location downwardly will be insignificant (without requiring any adjustment of the plunger mechanism or neck ring, which is conventionally required in prior art structures where the blankmolds are supported proximate the top of the mold. Additionally, by using conventional blowmolds 380 (FIG. 44) which are hung from the top via a downwardly projecting, annularly extending lip 382 having a number of segments supported by a corresponding upwardly projecting, annularly extending lip on the blow mold support insert (not shown), which also can have a number of segments (at a location proximate the neck ring groove), expansion of the blowmold halves due to heat will also occur in the direction away from the finish (the threaded portion) thereby being consistent at both stations.

As can be appreciated, while in the prior art, to shift from one configuration (single, double, triple gob) at one center distance to the same or a different configuration at a different center distance, often required the purchase of a different I.S. machine or a substantial rebuilding of an existing machine. The primary reason for this is the complicated mold open and close linkages which defined different geometries. The disclosed I.S. machine is a universal center distance machine. It can be changed from any desired configuration/center distance to any other desired configuration/center distance simply by replacing a number of parts which define a desired configuration/center distance; i.e., by replacing the quick change mold carrier assembly of the mold opening and closing mechanism, the mounting plate, transition plate and perhaps the plunger canisters of the plunger mechanism, the neck ring holders and at the blow station the mold cooling mechanism would as is conventional be changed to change machine's configuration.

The takeout mechanism, which is shown in FIGS. 45–47, is mounted on the top surface 94 of the top wall 134 of the section frame and has a takeout tong head 450 which can releasable grip the bottle(s) at the blow station and which is supported by an X-axis slide 452 slidably carried by a "Z" axis mounting housing or slide 454 which is slidably displaceable along a Z-axis column 456. The X and Z axes are controlled by suitable servomotors 457, 458. The bottles formed at the blow station, whatever their height, will always have their finish located at a fixed vertical location ("Z" datum) and the bottom surface of a bottle may be located at different vertical locations (ZB1,ZB2) relative to this Z datum within the vertical height range of the bottles. These bottles are gripped by the takeout tong head, removed from the blow station and deposited on a deadplate 460 which may be located at a variety of Z locations (ZD1,ZD2). A short bottle will travel a different Z distance (Z1) than will a tall bottle (Z2). The takeout control (FIG. 47) defines an X–Z displacement profile for the takeout tong head for any "Z" offset (ZB-ZD), and effects the desired displacement.

We claim:

1. A plunger mechanism for a section of an I.S. Machine having a section frame having a top surface having vertical opening means comprising
    at least one plunger canister having lower cylinder means and an upper flange,
    a horizontal mounting plate having a top surface and vertical opening means therein for receiving said lower cylinder means of each of said plunger canisters, and
    means for fixedly securing said mounting plate on the top surface of said section frame with said lower cylinder means of each of said plunger canisters extending through the vertical opening means of the top surface and
    means for securing each of said flanges to the top surface of said mounting plate.

2. A plunger mechanism for a section of an I.S. Machine according to claim 1, wherein said mounting plate opening means comprises an opening for each of said plunger canisters selectively configured to slidingly receive the lower cylinder means of each of said plunger canisters to locate the axis of each of said plunger canisters at a selected location.

3. A plunger mechanism for a section of an I.S. Machine according to claim 2, wherein the top surface of the section frame on which said mounting plate is secured is machined flat.

4. A plunger mechanism for a section of an I.S. Machine according to claim 3, wherein the top and bottom surface of said mounting plate are machined parallel.

5. A plunger mechanism for a section of an I.S. Machine according to claim 4, wherein said mounting plate includes an opening for slidingly receiving each of said plunger canisters, each of said openings being located to selectively locate the axis of each of said plunger canisters.

6. An I.S. Machine for making glass bottles, having a plurality of sections each having a blank station for forming a parison, each section comprising
    a section frame having a top surface, and
    a plunger mechanism including
        at least one plunger canister having lower, cylinder means and an upper flange,
        a horizontal mounting plate having a top surface and vertical opening means therein for receiving said lower cylinder means of each of said plunger canisters, and
        means for fixedly securing said mounting plate on said top surface of said section frame,
    said section frame top surface having vertical opening means therein for receiving said lower cylinder means of each of said plunger canisters and
    said plunger mechanism further comprising means for securing each of said flanges to the top surface of said mounting plate.

7. An I.S. Machine for making glass bottles according to claim 1, wherein said mounting plate opening means comprises an opening for each of said plunger canisters selectively configured to slidingly receive the lower cylinder means of each of said plunger canisters to locate the axis of each of said plunger canisters at a selected location.

8. An I.S. Machine for making glass bottles according to claim 7, wherein said the top surface of said section frame on which said mounting plate is secured is machined flat.

9. An I.S. Machine for making glass bottles according to claim 7, wherein the top and bottom surface of said mounting plate are machined parallel.

10. An I.S. Machine for making glass bottles according to claim 7, wherein said mounting plate includes an opening for slidingly receiving each of said plunger canisters, each of said openings being located to selectively locate the axis of each of said plunger canisters.

* * * * *